US012694423B2

(12) United States Patent
Kim et al.

(10) Patent No.: US 12,694,423 B2
(45) Date of Patent: *Jul. 28, 2026

(54) METHOD FOR PROVIDING VIRTUAL KEYBOARD SERVICE THAT PAYS CRYPTOCURRENCY REWARD AND APPARATUS USING THE SAME

(71) Applicant: SK Planet Co., Ltd., Seongnam-si (KR)

(72) Inventors: Chang-Young Kim, Seongnam-si (KR); Ho-Jung Ryu, Seongnam-si (KR); Keum-Jeong Jeong, Seongnam-si (KR)

(73) Assignee: SK Planet Co., Ltd., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 19/008,221

(22) Filed: Jan. 2, 2025

(65) Prior Publication Data

US 2025/0139654 A1 May 1, 2025

Related U.S. Application Data

(62) Division of application No. 18/459,272, filed on Aug. 31, 2023.

(30) Foreign Application Priority Data

Dec. 19, 2022 (KR) ........................ 10-2022-0178645
Dec. 19, 2022 (KR) ........................ 10-2022-0178646

(51) Int. Cl.
 *G06Q 30/00* (2023.01)
 *G06Q 30/0208* (2023.01)
 *G05B 19/418* (2006.01)

(52) U.S. Cl.
 CPC ............................... *G06Q 30/0208* (2013.01)

(58) Field of Classification Search
 CPC .................................................. G06Q 30/0208
 See application file for complete search history.

(56) References Cited

U.S. PATENT DOCUMENTS 11,562,451 B1   1/2023  Kozlowski, III
2010/0279720 A1  11/2010  Schultz et al.
(Continued)

FOREIGN PATENT DOCUMENTS

KR    10-2019-0009165      1/2019
KR    10-2019-0064074      6/2019
(Continued)

OTHER PUBLICATIONS https://whitepaper.stepn.com/ ("StepN"). (Year: 2011).*
(Continued)

*Primary Examiner* — Maria V Vanderhorst
(74) *Attorney, Agent, or Firm* — WTA IP Law P.C.

(57) ABSTRACT

Disclosed herein are a method for providing a virtual keyboard service that pays a cryptocurrency reward in consideration of an association between a keyboard NFT and a word NFT and an apparatus therefor. The use of a virtual keyboard by a user having a keyboard NFT may be monitored based on an application, the ability of the keyboard NFT may be measured in consideration of the attribute of the keyboard NFT that changes depending on the amount of usage of the virtual keyboard and the amount of usage of a word of a word NFT mapped to the user, an amount of cryptocurrency corresponding to the ability of the keyboard NFT may be mined while the virtual keyboard is being used, and the mined cryptocurrency may be paid to the user as a reward.

6 Claims, 33 Drawing Sheets

(56)                    References Cited

U.S. PATENT DOCUMENTS

| | | | |
|---|---|---|---|
| 2015/0161386 A1* | 6/2015 | Gupta | G06N 5/04 |
| | | | 726/22 |
| 2020/0258079 A1 | 8/2020 | Kim | |
| 2023/0014928 A1* | 1/2023 | Yang | A63F 13/71 |
| 2023/0075884 A1 | 3/2023 | Jakobsson | |
| 2023/0281583 A1 | 9/2023 | Jakobsson et al. | |
| 2023/0419354 A1* | 12/2023 | Kim | H04L 9/50 |
| 2024/0070711 A1* | 2/2024 | Checo | G06Q 30/0236 |
| 2024/0160967 A1 | 5/2024 | Richter | |

FOREIGN PATENT DOCUMENTS

| | | |
|---|---|---|
| KR | 10-2020-0056093 | 5/2020 |
| KR | 10-2020-0139467 | 12/2020 |
| KR | 10-2022-0053526 | 4/2022 |

OTHER PUBLICATIONS

"Blockchainizing the Wordle Game in Advanced Metaverse Realms Using Smart Wearables". IEEE. 2022. (Year: 2022).*
"Mistype resistant keyboard (NexKey)". IEEE. 2018. (Year: 2018).*
Stepn, Wayback Machine Whitepaper, Apr. 22, 2022. https://whitepaper.stepn.com/.
Muhammad Shahid Bhatti et al. "Mistype resistant keyboard (NexKey)" Computer Science Department, COMSATS Institute of Information Technology, Pakistan, IEEE 2018.

* cited by examiner

610

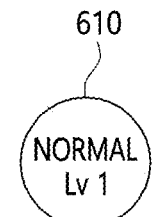

NORMAL
Lv 1

EFFICIENCY:5 / DURABILITY:5
STAT POINT:0
NUMBER OF TIMES AVAILABLE
FOR ENHANCEMENT:1
NUMBER OF WORDS
THAT CAN BE STORED:1

620

RARE
Lv 1

EFFICIENCY:7 / DURABILITY:7
STAT POINT:0
NUMBER OF TIMES AVAILABLE
FOR ENHANCEMENT:3
NUMBER OF WORDS
THAT CAN BE STORED:2

630

LEGEND
Lv 1

EFFICIENCY:10 / DURABILITY:10
STAT POINT:0
NUMBER OF TIMES AVAILABLE
FOR ENHANCEMENT:5
NUMBER OF WORDS
THAT CAN BE STORED:3

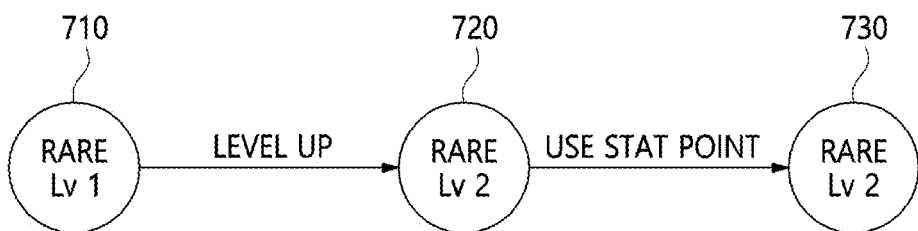

RARE
Lv 1

LEVEL UP

RARE
Lv 2

USE STAT POINT

RARE
Lv 2

720

730

EFFICIENCY:7 / DURABILITY:7
STAT POINT:0
NUMBER OF TIMES AVAILABLE
FOR ENHANCEMENT:3
NUMBER OF WORDS
THAT CAN BE STORED:2

EFFICIENCY:7 / DURABILITY:7
STAT POINT:1
NUMBER OF TIMES AVAILABLE
FOR ENHANCEMENT:3
NUMBER OF WORDS
THAT CAN BE STORED:2

EFFICIENCY:8 / DURABILITY:7
STAT POINT:0
NUMBER OF TIMES AVAILABLE
FOR ENHANCEMENT:3
NUMBER OF WORDS
THAT CAN BE STORED:2

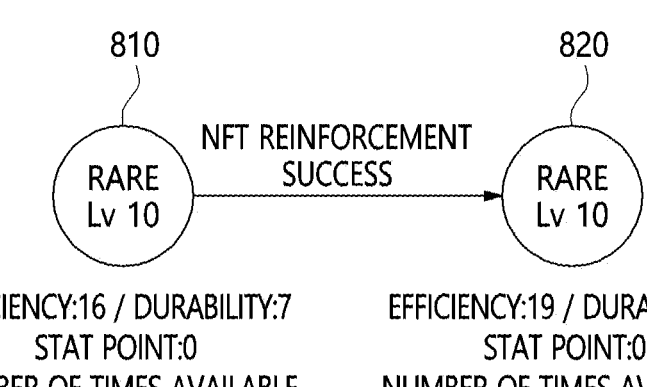

NFT REINFORCEMENT
SUCCESS

RARE
Lv 10                                                   RARE
                                                        Lv 10

EFFICIENCY:16 / DURABILITY:7                EFFICIENCY:19 / DURABILITY:7
STAT POINT:0                                STAT POINT:0
NUMBER OF TIMES AVAILABLE                   NUMBER OF TIMES AVAILABLE
FOR ENHANCEMENT:3                           FOR ENHANCEMENT:2
NUMBER OF WORDS                             NUMBER OF WORDS
THAT CAN BE STORED:2                        THAT CAN BE STORED:2

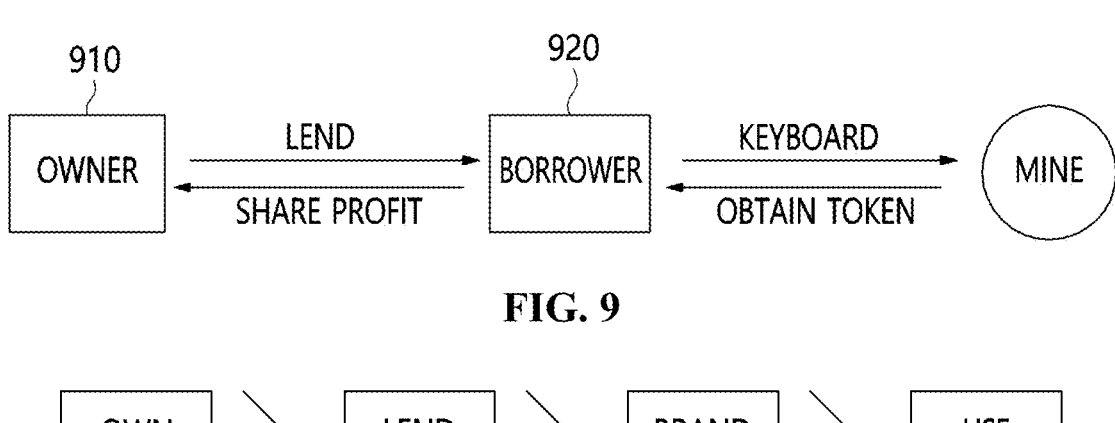

OWNER    LEND    BORROWER    KEYBOARD    MINE
         SHARE PROFIT        OBTAIN TOKEN

FIG. 9

OWN NFT    LEND NFT    BRAND THEME    USE KEYBOARD

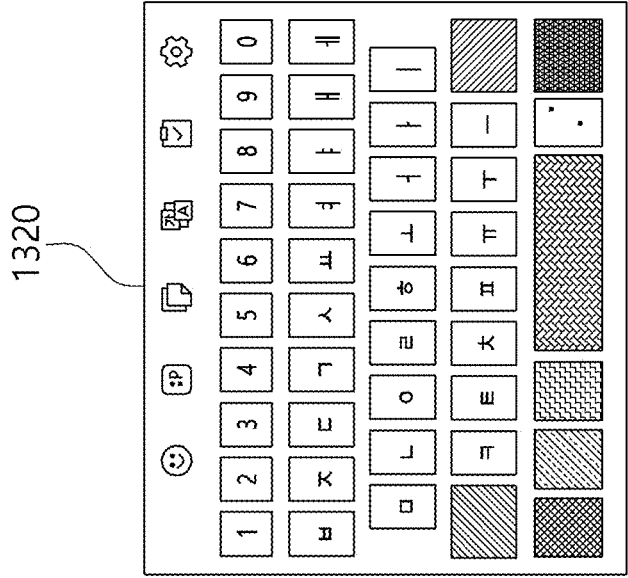
1320
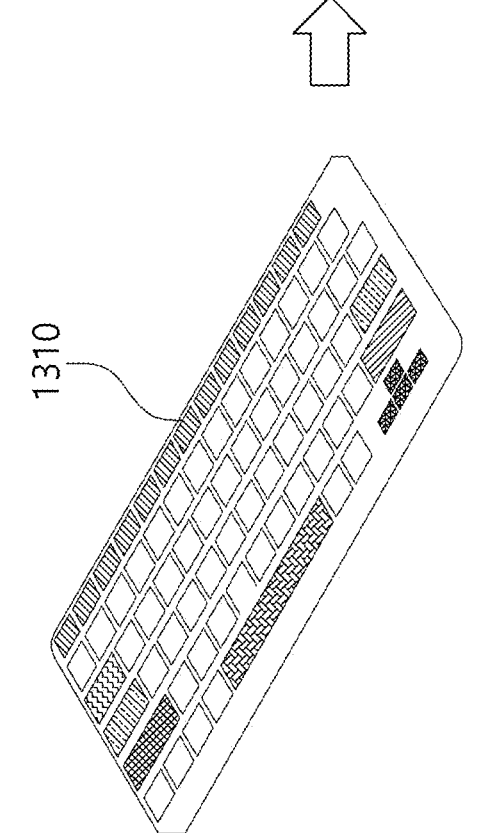
1310
FIG. 13

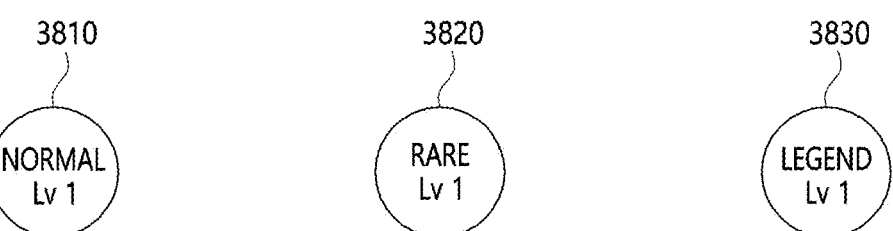

3810

NORMAL
Lv 1

EFFICIENCY:5 / DURABILITY:5
STAT POINT:0
NUMBER OF TIMES AVAILABLE
FOR ENHANCEMENT:1
NUMBER OF WORDS
THAT CAN BE STORED:1

3820

RARE
Lv 1

EFFICIENCY:7 / DURABILITY:7
STAT POINT:0
NUMBER OF TIMES AVAILABLE
FOR ENHANCEMENT:3
NUMBER OF WORDS
THAT CAN BE STORED:2

3830

LEGEND
Lv 1

EFFICIENCY:10 / DURABILITY:10
STAT POINT:0
NUMBER OF TIMES AVAILABLE
FOR ENHANCEMENT:5
NUMBER OF WORDS
THAT CAN BE STORED:3

FIG. 38

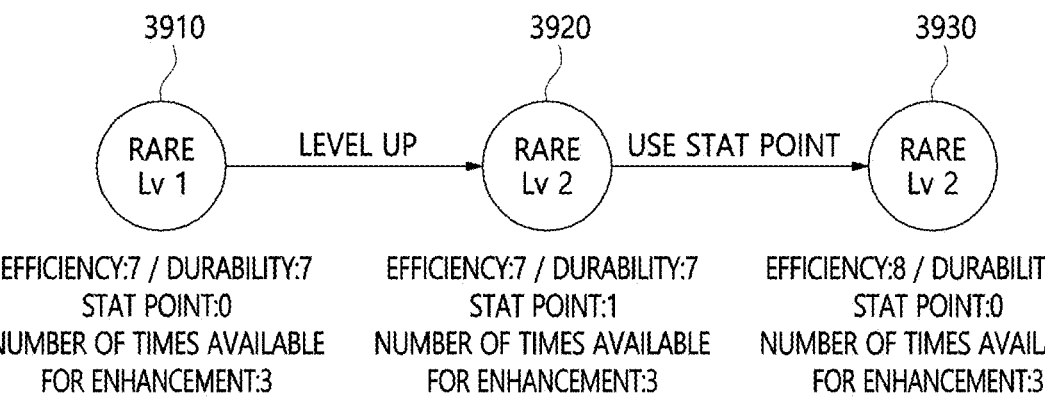

3910

RARE
Lv 1

LEVEL UP

3920

RARE
Lv 2

USE STAT POINT

3930

RARE
Lv 2

EFFICIENCY:7 / DURABILITY:7
STAT POINT:0
NUMBER OF TIMES AVAILABLE
FOR ENHANCEMENT:3
NUMBER OF WORDS
THAT CAN BE STORED:2

EFFICIENCY:7 / DURABILITY:7
STAT POINT:1
NUMBER OF TIMES AVAILABLE
FOR ENHANCEMENT:3
NUMBER OF WORDS
THAT CAN BE STORED:2

EFFICIENCY:8 / DURABILITY:10
STAT POINT:0
NUMBER OF TIMES AVAILABLE
FOR ENHANCEMENT:3
NUMBER OF WORDS
THAT CAN BE STORED:2

FIG. 39

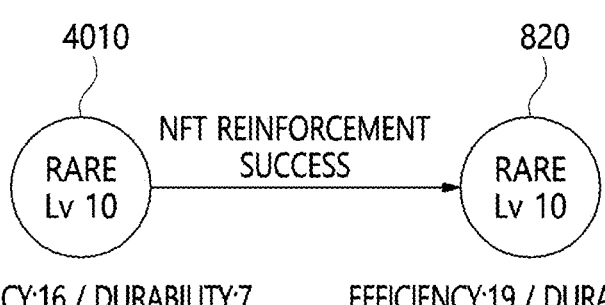

4010

820

NFT REINFORCEMENT
SUCCESS

RARE
Lv 10

RARE
Lv 10

EFFICIENCY:16 / DURABILITY:7
STAT POINT:0
NUMBER OF TIMES AVAILABLE
FOR ENHANCEMENT:3
NUMBER OF WORDS
THAT CAN BE STORED:2

EFFICIENCY:19 / DURABILITY:7
STAT POINT:0
NUMBER OF TIMES AVAILABLE
FOR ENHANCEMENT:2
NUMBER OF WORDS
THAT CAN BE STORED:2

FIG. 40

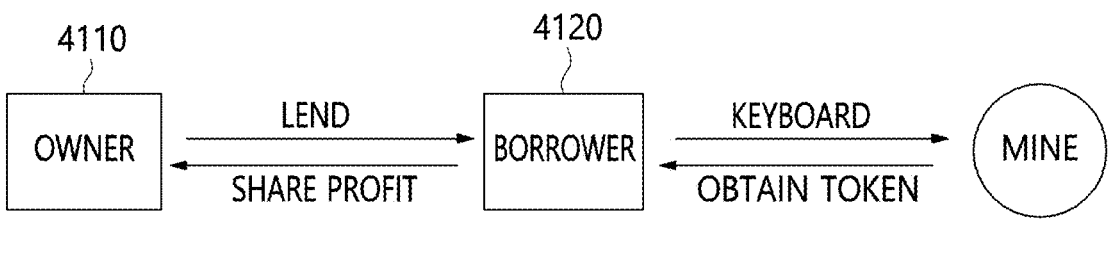

4110

4120

OWNER

LEND

SHARE PROFIT

BORROWER

KEYBOARD

OBTAIN TOKEN

MINE

FIG. 41

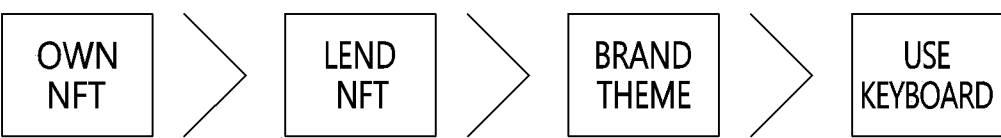

OWN
NFT

LEND
NFT

BRAND
THEME

USE
KEYBOARD

METHOD FOR PROVIDING VIRTUAL KEYBOARD SERVICE THAT PAYS CRYPTOCURRENCY REWARD AND APPARATUS USING THE SAME

CROSS REFERENCE TO RELATED APPLICATIONS

This is a divisional application of U.S. patent application Ser. No. 18/459,272, filed on Aug. 31, 2023, which claims priority to Korean Patent Applications No. 10-2022-0178645, filed on Dec. 19, 2022, and No. 10-2022-0178646, filed on Dec. 19, 2022, which are hereby incorporated by reference in their entireties into this application.

BACKGROUND

1. Technical Field

The present disclosure relates generally to technology for providing a virtual keyboard service that pays a cryptocurrency reward, and more particularly to virtual keyboard service technology that pays a cryptocurrency reward in consideration of the association between a keyboard non-fungible token (NFT) and a word NFT or pays a cryptocurrency reward in consideration of the rate of change in an NFT attribute based on an application.

2. Description of the Related Art

With the recent increasing interest in non-fungible token (NFT), a large number of X to Earn (X2E) projects combined with blockchain technology has been launched. Here, 'X2E' is a term to indicate that rewards are given for specific behavior.

For example, there is a service such as Play to Earn (P2E) or Move to Earn (M2E) through which users are able to make money by mining coins while playing a game or while walking or running.

These services are provided to users such that the users monetize virtual assets paid as a reward for the game play or monetize virtual assets corresponding to the increased value of a purchased NFT.

SUMMARY

An object of the present disclosure is to provide a keyboard NFT and a word NFT, which have attributes associated with each other, thereby enabling a user to be provided with a cryptocurrency reward while using a virtual keyboard.

Another object of the present disclosure is to increase, when a virtual keyboard is executed through a specific application, the amount of cryptocurrency mining depending on the amount of usage of the virtual keyboard, thereby encouraging users to use the specific application.

A further object of the present disclosure is to provide Communication To Earn (C2E), that is, a service through which users are able to make money by communicating with each other, thereby providing a service capable of incentivizing family members, friends, and acquaintances to actively communicate with each other and providing benefits therethrough.

Yet another object of the present disclosure is to provide a virtual keyboard service in which blockchain technology is introduced into virtual keyboards used in user terminals, thereby providing distinctive customer benefits and experiences in comparison with a conventional virtual keyboard service that offers points as a reward.

Still another object of the present disclosure is to enable a large number of users not only to use virtual keyboards for terminals but also to be provided with more various benefits depending on the amount of usage thereof.

Still another object of the present disclosure is to design the structure of a virtual keyboard service paying a cryptocurrency reward so as to enable the transition to or from a virtual keyboard service through which points can be saved, thereby effectively securing a large number of customers.

In order to accomplish the above objects, a method for providing a virtual keyboard service that pays a cryptocurrency reward in consideration of an association between a keyboard NFT and a word NFT according to the present disclosure includes monitoring the use of a virtual keyboard by a user having a keyboard NFT through an application, measuring the ability of the keyboard NFT in consideration of an attribute of the keyboard NFT that changes depending on the amount of usage of the virtual keyboard and the amount of usage of a word of a word NFT mapped to the user, mining an amount of cryptocurrency corresponding to the ability of the keyboard NFT while the virtual keyboard is being used, and paying the mined cryptocurrency to the user as a reward.

Here, the attribute of the keyboard NFT may include efficiency, which is a positive attribute having a value increasing depending on the amount of usage, and durability, which is a negative attribute having a value decreasing depending on the amount of usage, the durability may decrease with an increase in the amount of usage, and the rate of decrease in the durability may decrease with an increase in the amount of usage of the word.

Here, the maximum number of word NFTs capable of being mapped may be set depending on the grade of the keyboard NFT.

Here, the ability of the keyboard NFT may correspond to a value acquired by applying the percentage of current remaining durability, which is calculated based on the default value of the durability, to the amount of usage of the virtual keyboard multiplied by the efficiency, and an amount of cryptocurrency corresponding to the ability of the keyboard NFT may be mined at each preset unit time while the virtual keyboard is being used.

Here, the efficiency may be increased using stat points that are given when the level of the keyboard NFT is raised based on experience points that are provided to correspond to the amount of usage, and the durability may be restored to the default value when cryptocurrency is paid for restoring the durability.

Here, the method may further include stopping mining the cryptocurrency when the degree of fatigue of the keyboard NFT is a maximum value or when the time allowed for the user to mine per day has elapsed; and restoring the degree of fatigue or the time allowed for the user to mine per day to the default value thereof when cryptocurrency is paid for restoring the degree of fatigue or the time allowed for the user to mine per day.

Here, the method may further include enhancing the keyboard NFT in consideration of the number of times available for enhancement, which is given to correspond to the grade of the keyboard NFT, and a preset probability of success of enhancement when cryptocurrency is paid for enhancing the keyboard NFT; and increasing the default value of the attribute of the keyboard NFT when enhancing the keyboard NFT succeeds.

Here, the number of times available for enhancement and the maximum number of word NFTs capable of being mapped may increase as the grade of the keyboard NFT is higher.

Here, the method may further include combining two different types of keyboard NFTs possessed by the user when cryptocurrency is paid for minting; and providing a new type of keyboard NFT created by the combination to the user when minting succeeds depending on a preset probability of success of minting.

Also, an apparatus for providing a virtual keyboard service that pays a cryptocurrency reward in consideration of an association between a keyboard NFT and a word NFT according to the present disclosure includes a processor for monitoring the use of a virtual keyboard by a user having a keyboard NFT through an application, measuring the ability of the keyboard NFT in consideration of an attribute of the keyboard NFT that changes depending on the amount of usage of the virtual keyboard and the amount of usage of a word of a word NFT mapped to the user, mining an amount of cryptocurrency corresponding to the ability of the keyboard NFT while the virtual keyboard is being used, and paying the mined cryptocurrency to the user as a reward; and memory for storing the keyboard NFT, the word NFT, and the cryptocurrency.

Here, the attribute of the keyboard NFT may include efficiency, which is a positive attribute having a value increasing depending on the amount of usage, and durability, which is a negative attribute having a value decreasing depending on the amount of usage, the durability may decrease with an increase in the amount of usage, and the rate of decrease in the durability may decrease with an increase in the amount of usage of the word.

Here, the maximum number of word NFTs capable of being mapped may be set depending on the grade of the keyboard NFT.

Here, the ability of the keyboard NFT may correspond to a value acquired by applying the percentage of current remaining durability, which is calculated based on the default value of the durability, to the amount of usage of the virtual keyboard multiplied by the efficiency, and an amount of cryptocurrency corresponding to the ability of the keyboard NFT may be mined at each preset unit time while the virtual keyboard is being used.

Here, the efficiency may be increased using stat points that are given when the level of the keyboard NFT is raised based on experience points that are provided to correspond to the amount of usage, and the durability may be restored to the default value when cryptocurrency is paid for restoring the durability.

Here, the processor may stop mining the cryptocurrency when the degree of fatigue of the keyboard NFT is a maximum value or when the time allowed for the user to mine per day has elapsed, and may restore the degree of fatigue or the time allowed for the user to mine per day to the default value thereof when cryptocurrency is paid for restoring the degree of fatigue or the time allowed for the user to mine per day.

Here, the processor may enhance the keyboard NFT in consideration of the number of times available for enhancement, which is given to correspond to the grade of the keyboard NFT, and a preset probability of success of enhancement when cryptocurrency is paid for enhancing the keyboard NFT, and may increase the default value of the attribute of the keyboard NFT when enhancing the keyboard NFT succeeds.

Here, the number of times available for enhancement and the maximum number of word NFTs capable of being mapped may increase as the grade of the keyboard NFT is higher.

Here, the processor may combine two different types of keyboard NFTs possessed by the user when cryptocurrency is paid for minting, and may provide a new type of keyboard NFT created by the combination to the user when minting succeeds depending on a preset probability of success of minting.

Also, a method for providing a virtual keyboard service that pays a cryptocurrency reward in consideration of a rate of change in an NFT attribute based on an application according to the present disclosure includes monitoring the use of a virtual keyboard by a user having a keyboard NFT through an application, setting the rate of change in a keyboard NFT attribute corresponding to the keyboard NFT and a weight for a word NFT mapped to the user in consideration of the type of the application, mining an amount of cryptocurrency corresponding to the ability of the keyboard NFT to which the rate of change is applied and the amount of usage of a word to which the weight is applied while the virtual keyboard is being used, and paying the mined cryptocurrency to the user as a reward.

Here, when the application is an affiliate application, the rate of change and the weight may be set to increase the amount of cryptocurrency mined at each unit time.

Here, the keyboard NFT attribute may include efficiency, which is a positive attribute having a value increasing depending on the amount of usage, and durability, which is a negative attribute having a value decreasing depending on the amount of usage, and the default value of the keyboard NFT attribute may be set differently depending on the grade of the keyboard NFT.

Here, when the application is the affiliate application, the rate of change may be set so as to correspond to at least one of an increase in the efficiency, or a decrease in the rate of decrease in the durability, or a combination thereof.

Here, when the application is the affiliate application, the weight may be increased so as to increase the amount of cryptocurrency mining depending on the amount of usage of the word.

Here, the amount of cryptocurrency mining may increase in proportion to the amount of usage of the word multiplied by the weight, and the amount of cryptocurrency mining may increase so as to correspond to a proportion that is preset depending on the number of word NFTs when multiple word NFTs are mapped to a single user.

Here, the ability of the keyboard NFT may correspond to a value acquired by applying the percentage of current remaining durability, which is calculated based on the default value of the durability, to the amount of usage multiplied by the efficiency.

Here, the efficiency may be increased using stat points that are given when the level of the keyboard NFT is raised based on experience points that are provided to correspond to the amount of usage, and the durability may decrease with an increase in the amount of usage, but may be restored to the default value when cryptocurrency is paid for restoring the durability.

Here, the method may further include stopping mining the cryptocurrency when the degree of fatigue of the keyboard NFT is a maximum value or when the time allowed for the user to mine per day has elapsed; and restoring the degree of fatigue or the time allowed for the user to mine per day to the default value thereof when cryptocurrency is paid for restoring the degree of fatigue or the time allowed for the user to mine per day.

Also, an apparatus for providing a virtual keyboard service that pays a cryptocurrency reward in consideration of a rate of change in an NFT attribute based on an application according to the present disclosure includes a processor for monitoring the use of a virtual keyboard by a user having a keyboard NFT through an application, setting the rate of change in a keyboard NFT attribute corresponding to the keyboard NFT and a weight for a word NFT mapped to the user in consideration of the type of the application, mining an amount of cryptocurrency corresponding to the ability of the keyboard NFT to which the rate of change is applied and the amount of usage of a word to which the weight is applied while the virtual keyboard is being used, and paying the mined cryptocurrency to the user as a reward; and memory for storing the keyboard NFT, the word NFT, and the cryptocurrency.

Here, when the application is an affiliate application, the rate of change and the weight may be set to increase the amount of cryptocurrency mined at each unit time.

Here, the keyboard NFT attribute may include efficiency, which is a positive attribute having a value increasing depending on the amount of usage, and durability, which is a negative attribute having a value decreasing depending on the amount of usage, and the default value of the keyboard NFT attribute may be set differently depending on the grade of the keyboard NFT.

Here, when the application is the affiliate application, the rate of change may be set so as to correspond to at least one of an increase in the efficiency, or a decrease in the rate of decrease in the durability, or a combination thereof.

Here, when the application is the affiliate application, the weight may be increased so as to increase the amount of cryptocurrency mining depending on the amount of usage of the word.

Here, the amount of cryptocurrency mining may increase in proportion to the amount of usage of the word multiplied by the weight, and the amount of cryptocurrency mining may increase so as to correspond to a proportion that is preset depending on the number of word NFTs when multiple word NFTs are mapped to a single user.

Here, the ability of the keyboard NFT may correspond to a value acquired by applying the percentage of current remaining durability, which is calculated based on the default value of the durability, to the amount of usage multiplied by the efficiency.

Here, the efficiency may be increased using stat points that are given when the level of the keyboard NFT is raised based on experience points that are provided to correspond to the amount of usage, and the durability may decrease with an increase in the amount of usage, but may be restored to the default value when cryptocurrency is paid for restoring the durability.

Here, the processor may stop mining the cryptocurrency when the degree of fatigue of the keyboard NFT is a maximum value or when the time allowed for the user to mine per day has elapsed, and may restore the degree of fatigue or the time allowed for the user to mine per day to the default value thereof when cryptocurrency is paid for restoring the degree of fatigue or the time allowed for the user to mine per day.

BRIEF DESCRIPTION OF THE DRAWINGS

The above and other objects, features, and advantages of the present disclosure will be more clearly understood from the following detailed description taken in conjunction with the accompanying drawings, in which:

FIG. 6 is a view illustrating an example of a grade of a keyboard NFT according to the present disclosure;

FIG. 7 is a view illustrating an example of a level of a keyboard NFT according to the present disclosure;

FIG. 8 is a view illustrating an example of keyboard NFT enhancement according to the present disclosure;

FIG. 9 is a view illustrating an example of the rental of an NFT according to the present disclosure;

FIG. 10 is a view illustrating an example of factors causing a change in the amount of cryptocurrency mining according to the present disclosure;

FIG. 13 is a view illustrating an example of a keyboard NFT according to the present disclosure;

FIG. 38 is a view illustrating an example of a grade of a keyboard NFT according to the present disclosure;

FIG. 39 is a view illustrating an example of a level of a keyboard NFT according to the present disclosure;

FIG. 40 is a view illustrating an example of keyboard NFT enhancement according to the present disclosure;

FIG. 41 is a view illustrating an example of the rental of an NFT according to the present disclosure;

FIG. 42 is a view illustrating an example of factors causing a change in the amount of cryptocurrency mining according to the present disclosure;

DESCRIPTION OF THE PREFERRED EMBODIMENTS

Figure 1:
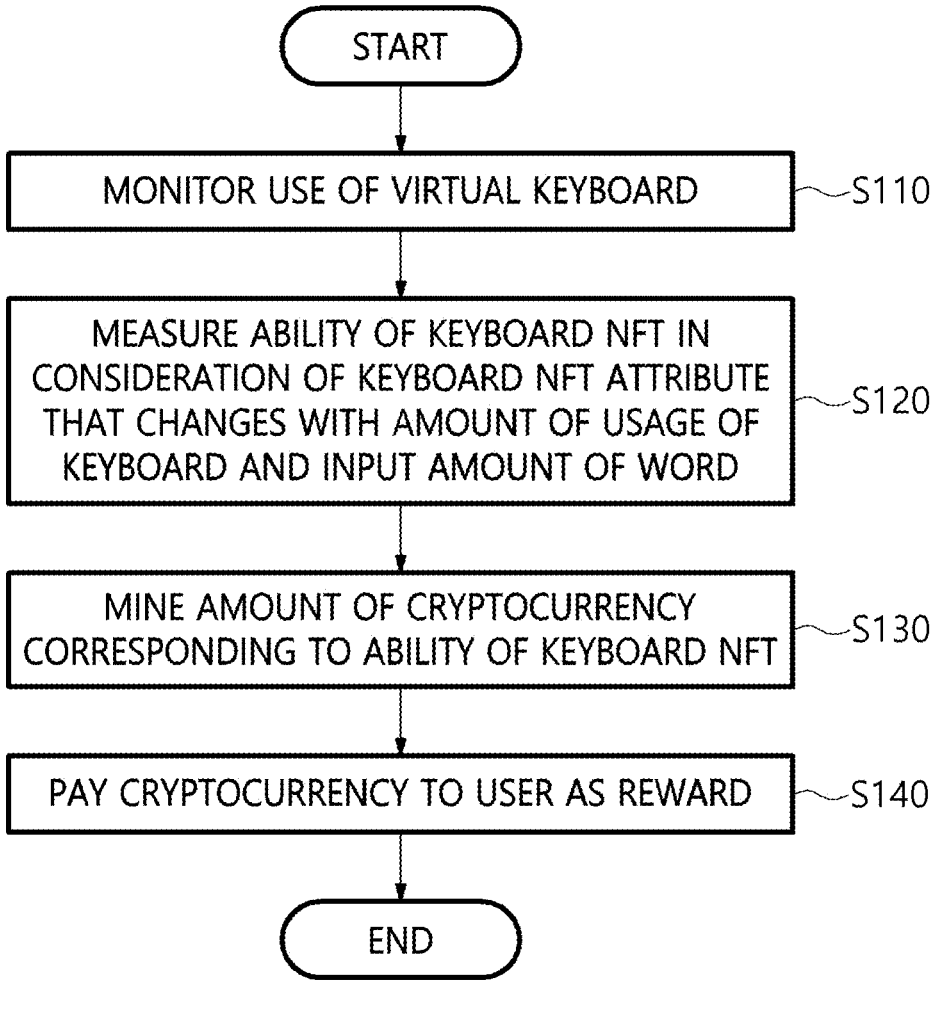
FIG. 1 is a flowchart illustrating a method for providing a virtual keyboard service that pays a cryptocurrency reward in consideration of an association between a keyboard NFT and a word NFT according to an embodiment of the present disclosure.

Hereinafter, a preferred embodiment of the present disclosure is described in detail with reference to the accompanying drawings. However, in the following description and the accompanying drawings, detailed descriptions of known functions or configurations deemed to obscure the gist of the present disclosure will be omitted. Also, it should be understood that the same reference numerals are used to designate the same or similar elements throughout the drawings.

Terms or words used in this specification and the claims should not be interpreted according to typical or dictionary meanings, but should be interpreted as having meanings and concepts adapted to the technical idea of the present disclosure based on the principle that an inventor may properly define the concept of the terms in order to explain the present disclosure in the best way. Therefore, embodiments disclosed herein and configurations illustrated in the drawings are merely preferred embodiments of the present disclosure and do not fully describe the technical idea of the present disclosure, and thus there may be various equivalents and alterations replacing them at the filing date of the present application. Also, it will be understood that, although the terms "first", "second", etc. may be used herein to describe various elements, these elements are not intended to be limited by these terms. These terms are only used to distinguish one element from another.

FIG. 1 is a flowchart illustrating a method for providing a virtual keyboard service that pays a cryptocurrency reward in consideration of an association between a keyboard NFT and a word NFT according to an embodiment of the present disclosure.

Referring to FIG. 1, in the method for providing a virtual keyboard service that pays a cryptocurrency reward in consideration of an association between a keyboard NFT and a word NFT according to an embodiment of the present disclosure, the use of a virtual keyboard by a user having a keyboard NFT is monitored based on an application at step S110.

Here, the user may install the application provided from a server in a user terminal and execute the same. Also, the user may purchase a keyboard NFT from an NFT market by accessing the NFT market through the application, and may then use a virtual keyboard.

Accordingly, when users who purchase a keyboard NFT from the NFT market activate and use a virtual keyboard in user terminals, the use of the virtual keyboard may be monitored.

Here, the keyboard NFT indicates a non-fungible token (NFT) that represents an item 1310 in the form of a keyboard, as illustrated in FIG. 13, and may be purchased from the NFT market that is accessible through the application installed in the user terminal.

For example, when a user purchases a keyboard NFT corresponding to the item 1310 in the form of a keyboard from the NFT market, a virtual keyboard to which a virtual keyboard skin 1320 that looks similar to the item 1310 in the form of a keyboard is applied may be activated and used in the user terminal. Accordingly, when chatting or communication occurs in the user terminal using the virtual keyboard to which the virtual keyboard skin 1320 is applied, this may be monitored, and a log about the use may be stored or managed.

Here, the virtual keyboard according to an embodiment of the present disclosure may be provided by being developed to correspond to SDK and APK types.

Also, in the method for providing a virtual keyboard service that pays a cryptocurrency reward in consideration of an association between a keyboard NFT and a word NFT according to an embodiment of the present disclosure, the ability of the keyboard NFT is measured in consideration of an attribute of the keyboard NFT that changes depending on the amount of usage of the virtual keyboard and the amount of usage a word of a word NFT mapped to the user at step S120.

Here, the attribute of the keyboard NFT may include efficiency, which is a positive attribute having a value increasing based on the amount of usage, and durability, which is a negative attribute having a value decreasing based on the amount of usage.

Here, the ability of the keyboard NFT may correspond to a value acquired by applying the percentage of the current remaining durability, which is calculated based on the default value of the durability, to the amount of usage multiplied by the efficiency.

Here, an amount of cryptocurrency corresponding to the ability may be mined at each preset unit time while the virtual keyboard is being used.

Here, the durability decreases with an increase in the amount of usage, but may be restored to the default value thereof when cryptocurrency is paid for restoring the durability.

For example, the user may restore the durability to the maximum value thereof, which corresponds to the default value, by paying tokens or coins stored in the digital wallet of the user, or may restore the durability by watching an advertisement provided by the system or inviting friends to the service according to the present disclosure.

Hereinafter, an attribute of a keyboard NFT and a cryptocurrency mining process based thereon will be described in detail with reference to FIGS. 2 to 4.

Figure 2:
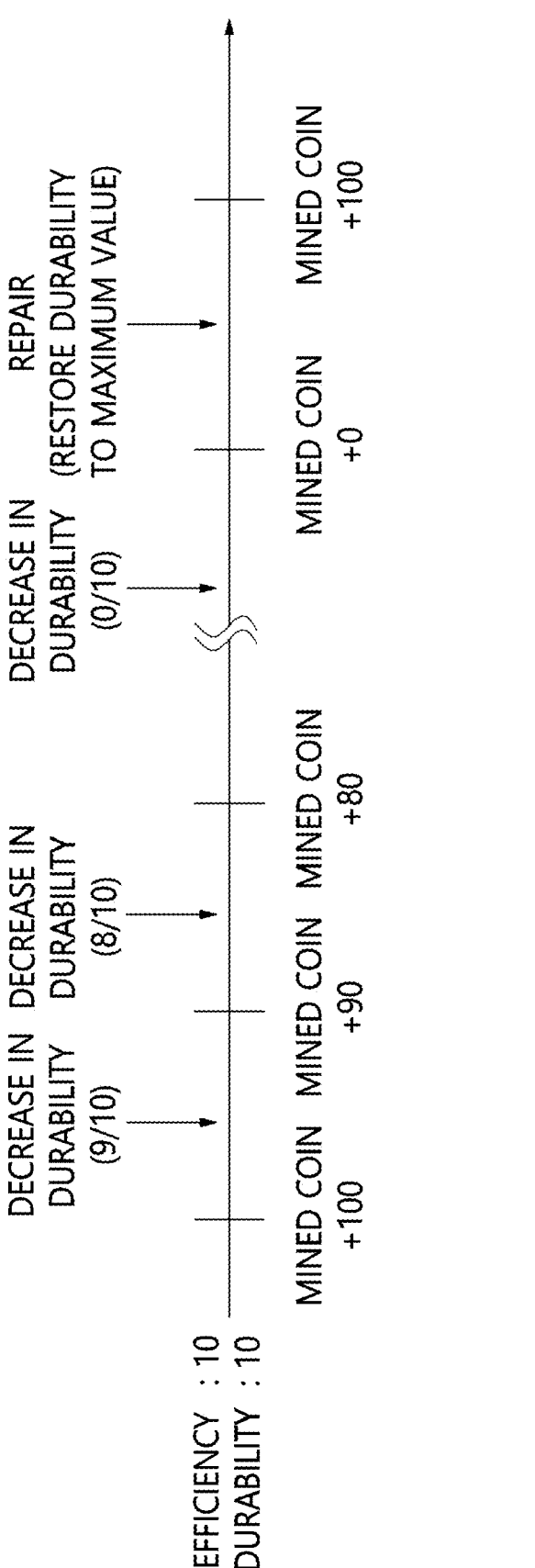
FIGS. 2 to 4 are views illustrating examples of an attribute of a keyboard NFT and the ability of the keyboard NFT based thereon according to the present disclosure.

First, FIG. 2 illustrates the amount of cryptocurrency mined per hour when a virtual keyboard, the efficiency and durability of which are respectively set to 10 and 10 as the default values thereof, is used.

For example, when it is assumed that the amount of usage of a virtual keyboard per unit time illustrated in FIG. 2 is 10, because the efficiency and the percentage of the remaining durability are 10 and 100%, respectively, during the first unit time, 100 coins, corresponding to 10*10*1, may be mined.

However, the durability decreases by 1 during the unit time after that, and the percentage of the remaining durability becomes 90%. Accordingly, it can be seen that only 90 coins, corresponding to 10*10*0.9, are mined during the corresponding unit time.

As described above, because the durability decreases at a constant rate while the virtual keyboard is being used, when the durability reaches 0, it becomes impossible to mine cryptocurrency.

Accordingly, when the durability reaches 0, the durability is restored to the default value corresponding to the maximum value thereof by repairing the durability, after which cryptocurrency may be mined again.

Figure 3:
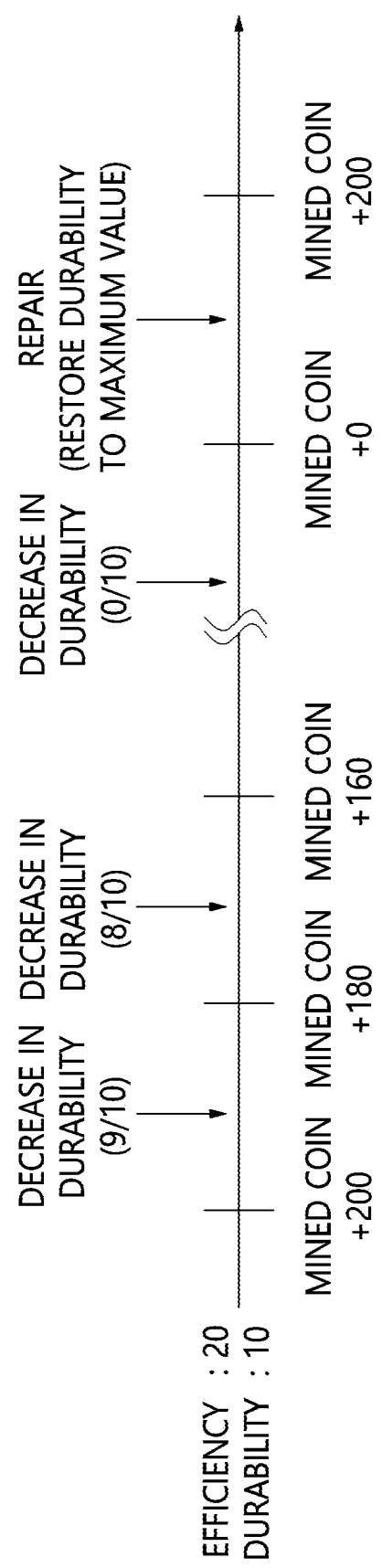

Also, FIG. 3 illustrates the amount of cryptocurrency mined per hour when a virtual keyboard, the efficiency and durability of which are respectively set to 20 and 10 as the default values thereof, is used.

For example, when it is assumed that the amount of usage of a virtual keyboard per unit time illustrated in FIG. 3 is 10, because the efficiency and the percentage of the remaining durability are 20 and 100%, respectively, during the first unit time, 200 coins, corresponding to 20*10*1, may be mined.

However, the durability decreases by 1 during the unit time after that, and the percentage of the remaining durability becomes 90%. Accordingly, only 180 coins, corresponding to 20*10*0.9, may be mined during the corresponding unit time.

Figure 4:
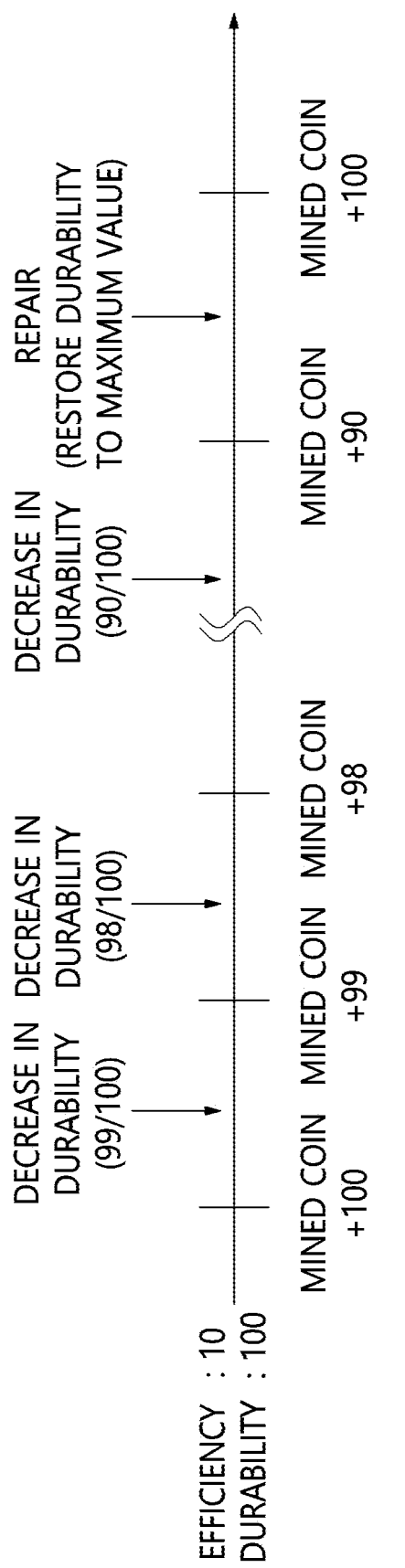

Also, FIG. 4 illustrates the amount of cryptocurrency mined per hour when a virtual keyboard, the efficiency and durability are respectively set to 10 and 100 as the default values thereof, is used.

For example, when it is assumed that the amount of usage of a virtual keyboard per unit time illustrated in FIG. 4 is 10, because the efficiency and the percentage of the remaining durability are 10 and 100%, respectively, during the first unit time, 100 coins, corresponding to 10*10*1, may be mined.

However, the durability decreases by 1 during the unit time after that, and the percentage of the remaining durability becomes 99%. Accordingly, only 99 coins, corresponding to 10*10*0.99, may be mined during the corresponding unit time.

Here, the rate of decrease in the durability may decrease with an increase in the amount of word usage.

Figure 5:
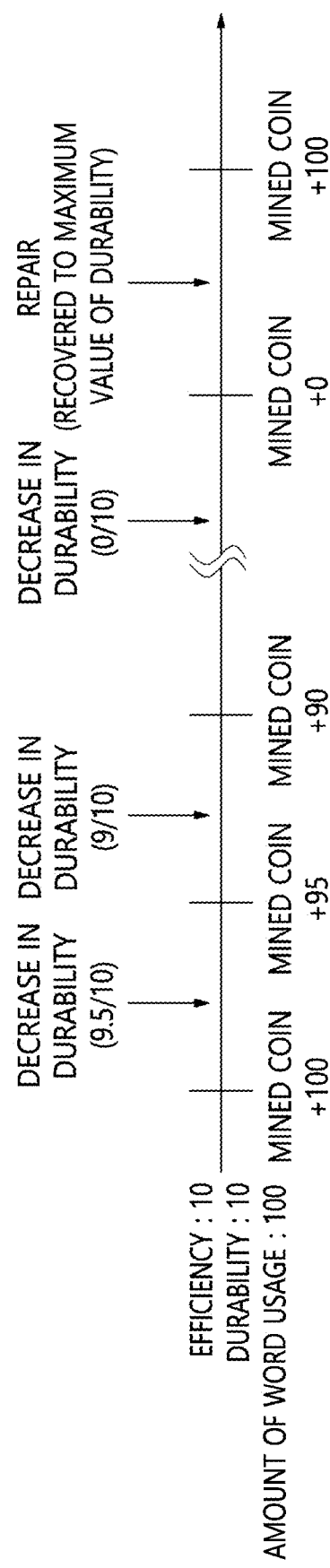
FIG. 5 is a view illustrating an example in which an attribute of a keyboard NFT changes depending on the amount of word usage according to the present disclosure.

For example, the virtual keyboard illustrated in FIG. 5 have the same efficiency and durability as the virtual keyboard illustrated in FIG. 2, but may be the case in which the rate of decrease in the durability is reduced depending on the amount of usage of a word of a word NFT.

Referring to FIG. 5, because the efficiency and the percentage of the remaining durability are 10 and 100%, respectively, during the first unit time, 100 coins, corresponding to 10*10*1, may be mined. However, the durability decreases by 0.5 during the unit time after that, and the percentage of the remaining durability becomes 95%. Accordingly, 95 coins, corresponding to 10*10*0.95, may be mined during the corresponding unit time.

Here, when the rate of decrease in the durability of the virtual keyboard illustrated in FIG. 2 is compared with that of the virtual keyboard illustrated in FIG. 5, it can be seen that the durability of the virtual keyboard illustrated in FIG. 2 decreases by 1 after the first unit time, but the durability of the virtual keyboard illustrated in FIG. 5 decreases by 0.5. That is, in the case of the virtual keyboard illustrated in FIG. 5, the rate of decrease in the durability is reduced based on the amount of word usage, 100, unlike the virtual keyboard illustrated in FIG. 2. As a result, the durability of the virtual keyboard is more slowly reduced, whereby the virtual keyboard may be used longer without a repair.

Here, the drawing illustrated in FIG. 5 corresponds to an embodiment, and the relationship between the amount of word usage and the rate of decrease in durability may be set and changed by a service administrator.

Here, the default value of the attribute of the keyboard NFT may be set differently depending on the grade of the keyboard NFT.

For example, referring to FIG. 6, the grades of a keyboard NFT according to the present disclosure may be classified into 'normal', 'rare', and 'legend'. 'Normal' may be the lowest grade, 'rare' may be a grade higher than 'normal', and 'legend' may be a grade higher than 'rare'.

Here, if the default values of the keyboard NFT attributes of the keyboard NFT 610 corresponding to the normal grade are set to efficiency of 5 and durability of 5, the default values of the keyboard NFT attributes of the keyboard NFT 620 corresponding to the rare grade may be set to efficiency of 7 and durability of 7 so as to be higher than those of the normal grade, and the default values of the keyboard NFT attributes of the keyboard NFT 630 corresponding to the legend grade may be set to efficiency of 10 and durability of 10 so as to be higher than those of the rare grade.

Here, the efficiency may be increased using stat points that are given when the level of the keyboard NFT is raised based on experience points that are provided so as to correspond to the amount of usage.

For example, referring to FIG. 7, when it is assumed that the level of the keyboard NFT 710 corresponding to the rare grade is raised from level 1 to level 2 based on the experience points, 1 point may be given as stat points. The given stat points may be used to increase the attribute of the keyboard NFT. That is, the stat points of the keyboard NFT 720 are used to increase the efficiency, as illustrated in FIG. 7, whereby the attributes of the keyboard NFT may be increased to efficiency of 8 and durability of 7, like the keyboard NFT 730.

Here, the level of the keyboard NFT may be the subordinate concept of the grade of the keyboard NFT, and may be raised in such a way that a user consumes tokens or coins corresponding to cryptocurrency. That is, the level of the keyboard NFT may be raised in response to a request from the user after the experience points provided to correspond to the amount of usage are accumulated to meet a preset level-up condition.

For example, if experience points meeting the preset level-up condition is 100, the user may use the virtual keyboard until the accumulated experience points become 100. Then, when the experience points become 100, the user may be notified of the fact that the level of the corresponding NFT keyboard can be raised, and the user may request to raise the level by paying tokens corresponding to cryptocurrency stored in the digital wallet. The NFT keyboard, the level of which is requested to be raised by paying the tokens, may have the raised level after a certain time elapses.

Here, the time spent raising the level may be set differently depending on the value of the current level.

For example, when it is assumed that it takes one hour to raise the level from level 1 to level 2, the time taken to raise the level from level 2 to level 3 may be set to two hours, and the time taken to raise the level from level 3 to level 4 may be set to three hours.

Also, although not illustrated in FIG. 1, in the method for providing a virtual keyboard service according to an embodiment of the present disclosure, when cryptocurrency is paid for enhancing the keyboard NFT, the keyboard NFT is enhanced in consideration of the number of times available for enhancement, which is given to correspond to the grade of the keyboard NFT, and a preset probability of success of enhancement.

Here, when enhancing the keyboard NFT succeeds, the default value of the attribute of the keyboard NFT may be increased.

Here, enhancing the keyboard NFT may be the method for increasing the default value of the attribute of the keyboard NFT, separately from the level-up of the keyboard NFT. However, in the case of the level of the keyboard NFT, the value of the level is represented, and the level may be an indicator that shows how much the user enhances the corresponding keyboard NFT.

For example, FIG. 8 illustrates the process of attempting to enhance the keyboard NFT 810 having level 10 and a rare grade when the keyboard NFT attributes thereof are set to efficiency of 16 and durability of 7 as the default values thereof. Here, because the number of times available for enhancement given to the keyboard NFT 810 is three, it can be seen that the keyboard NFT 810 may be enhanced three times. When a user attempts to enhance the keyboard NFT by paying cryptocurrency and succeeds in enhancement, the default values of the keyboard NFT attributes may increase to efficiency of 19 and durability of 7, and simultaneously, the number of times available for enhancement may be reduced to 2, as illustrated in FIG. 8.

Here, the higher the grade of the keyboard NFT, the greater the number of times available for enhancement and the maximum number of word NFTs capable of being mapped.

That is, because the number of times available for enhancement varies depending on the grade of the keyboard NFT, as illustrated in FIG. 6, more opportunities to improve the default values of the attributes of the keyboard NFT may be given as the grade of the keyboard NFT is higher.

Here, the grade of the keyboard NFT is set when the keyboard NFT is purchased, and once the grade of the keyboard NFT is set, it may not be changed. Accordingly, the higher the grade of the keyboard NFT, the higher the set value of the NFT.

For example, if a keyboard NFT of a normal grade can be purchased for 10 coins, a keyboard NFT of a rare grade may be purchased for 100 coins, and a keyboard NFT of a legend grade may be purchased for 1000 coins.

Here, the increase in the default value of the NFT attribute by enhancement of the keyboard NFT may be applied immediately when enhancement succeeds. Also, the increment in the default value of the NFT attribute by enhancement of the keyboard NFT may be greater than the increment in the default value of the NFT attribute by the stat points, which are given when the level of the keyboard NFT is raised.

Also, although not illustrated in FIG. 1, in the method for providing a virtual keyboard service that pays a cryptocurrency reward in consideration of an association between a keyboard NFT and a word NFT according to an embodiment of the present disclosure, when the degree of fatigue of the keyboard NFT is the maximum value thereof or when the time allowed for the user to mine per day has elapsed, cryptocurrency mining is stopped.

That is, the degree of fatigue may be a concept opposite to energy required to mine cryptocurrency through a keyboard NFT. Accordingly, when the degree of fatigue reaches the maximum value thereof, it is determined that there is no energy required to mine cryptocurrency, and the user may not mine cryptocurrency even though the user continues using the virtual keyboard.

Here, the degree of fatigue may be initialized at each preset initialization period.

For example, assuming that the preset initialization period is one day, even though cryptocurrency cannot be mined today because the degree of fatigue reaches the maximum value thereof, the degree of fatigue can be initialized tomorrow, whereby it becomes possible to mine cryptocurrency again.

Here, the time allowed to mine per day is a concept similar to the degree of fatigue, but may be an attribute having another concept.

For example, the degree of fatigue is a concept in which cryptocurrency mining is stopped when the value thereof reaches the maximum value by gradually increasing from the default value thereof that is set to 0, and the time allowed to mine per day may be a concept in which cryptocurrency mining is stopped when the total amount of time during which the user mines cryptocurrency becomes eight hours if the default value thereof is set to eight hours.

Here, when cryptocurrency is paid for restoring the degree of fatigue or the time allowed to mine per day, the degree of fatigue or the time allowed to mine per day may be restored to the default value thereof.

Also, the degree of fatigue or the time allowed to mine per day may be restored by watching an advertisement provided by the system or inviting friends to the service according to the present disclosure.

Also, in the method for providing a virtual keyboard service that pays a cryptocurrency reward in consideration of an association between a keyboard NFT and a word NFT according to an embodiment of the present disclosure, an amount of cryptocurrency corresponding to the ability of the keyboard NFT is mined at step S130 while the virtual keyboard is being used.

Here, the mined cryptocurrency may be a type of keyboard tokens created for the corresponding service. The keyboard tokens may be used for the repair, the restoration, the purchase, and the like of the keyboard NFT, or may be exchanged with external coins through a cryptocurrency exchange.

Also, in the method for providing a virtual keyboard service that pays a cryptocurrency reward in consideration of an association between a keyboard NFT and a word NFT according to an embodiment of the present disclosure, the mined cryptocurrency is paid to the user as a reward at step S140.

Here, the mined cryptocurrency may be unstable tokens or keyboard tokens autonomously issued by the company providing the service according to the present disclosure, and the issued tokens may be used after being changed to external coins.

For example, when the user requests to change keyboard tokens A mined through the use of the virtual keyboard to external coins B, the current price of keyboard tokens A and that of external coins B are compared with each other, and a number of external coins B equal to the value of keyboard tokens A, which are requested to be changed, may be paid.

Also, although not illustrated in FIG. 1, in the method for providing a virtual keyboard service that pays a cryptocurrency reward in consideration of an association between a keyboard NFT and a word NFT according to an embodiment of the present disclosure, a weight is given to the ability of the keyboard NFT in consideration of whether a brand theme is applied.

That is, when the brand theme is applied, a weight is given to the ability of the keyboard NFT, whereby the amount of cryptocurrency mining may increase.

Here, the brand theme corresponds to a virtual keyboard skin that is produced and provided through affiliation with a company, and may be in the form of a skin that exposes a brand name or a brand logo on the virtual keyboard.

Figure 11:
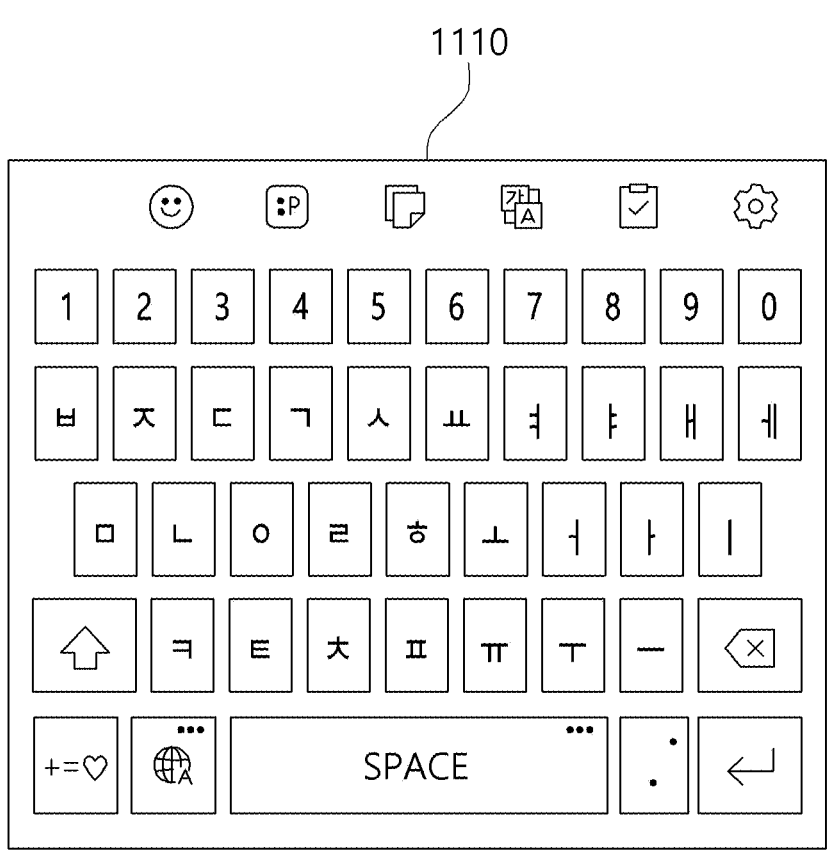
FIG. 11 is a view illustrating an example of a virtual keyboard according to the present disclosure.
Figure 12:
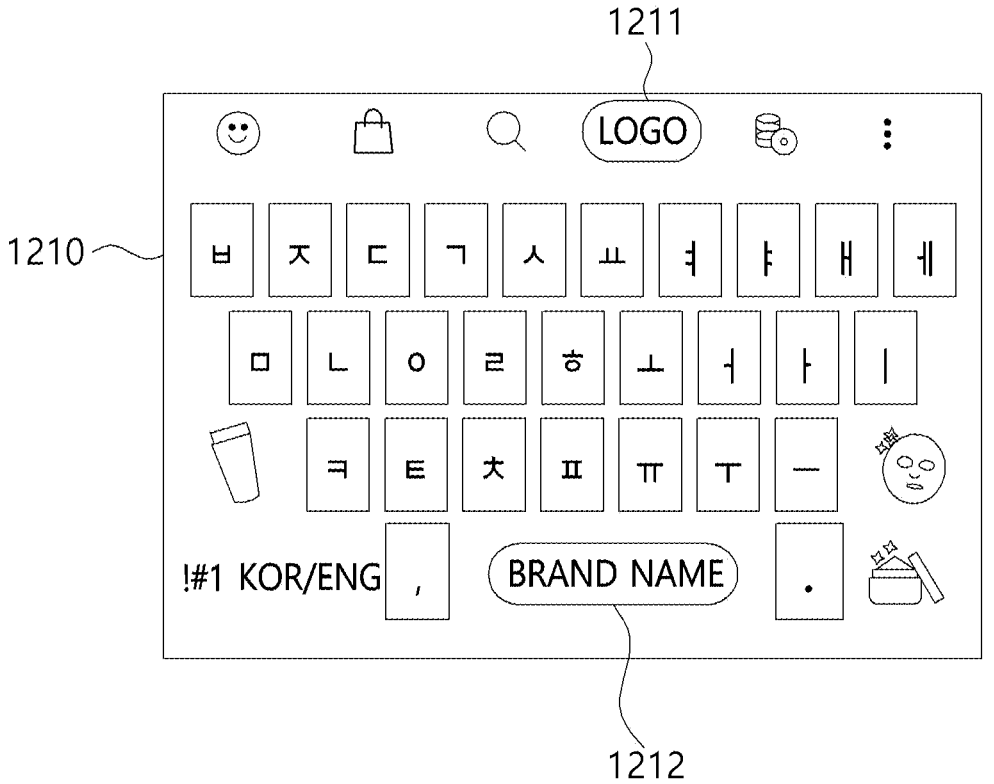
FIG. 12 is a view illustrating an example of a virtual keyboard to which a brand theme is applied according to the present disclosure.

For example, assuming that the virtual keyboard 1110 illustrated in FIG. 11 is in the state in which no skin is applied, it can be seen that the virtual keyboard 1210 to which a brand theme is applied exposes a brand logo 1211 and a brand name 1212 through the skin, as illustrated in FIG. 12. Here, the brand logo 1211 or the brand name 1212 may be information that is simply exposed or may function as a link to the homepage or application of the affiliate company that provides the brand theme.

That is, the company providing the brand theme may have the effect of advertising the brand, and the user applies the brand theme, thereby giving a weight to the ability of the keyboard NFT and mining more cryptocurrency.

Here, FIG. 12 shows only an embodiment for the brand logo 1211 or the brand name 1212 based on application of the brand theme, but application of the brand theme is not limited to this configuration.

For example, the brand theme may be alternatively applied by exposing a brand advertisement in the margin space of the virtual keyboard or exposing a character, design, or the like for representing a specific brand on the virtual keyboard.

Also, the brand theme may be distributed free by the affiliate company in order to advertise the brand, or may be issued in the form of an NFT skin and managed as a limited edition of an NFT having rarity.

Also, although not illustrated in FIG. 1, in the method for providing a virtual keyboard service according to an embodiment of the present disclosure, cryptocurrency is paid to the user as a reward for lending the keyboard NFT.

In the present disclosure, NFTs may be purchased, sold, or lent through the NFT market accessible through an application. When the user lends his or her NFT to another user, the borrower 920 may pay a reward for the NFT to the user by sharing part of the reward (tokens) mined through the use of the virtual keyboard with the owner 910 who lent the NFT, as illustrated in FIG. 9.

Also, although not illustrated in FIG. 1, in the method for providing a virtual keyboard service that pays a cryptocurrency reward in consideration of an association between a keyboard NFT and a word NFT according to an embodiment of the present disclosure, when cryptocurrency is paid for minting, two different types of keyboard NFTs possessed by the user are combined, and a new type of keyboard NFT created through the combination is provided to the user when minting succeeds depending on a preset probability of success of minting.

Here, minting may correspond to a concept of creating a user's own NFT, that is, cryptocurrency. Accordingly, the new NFT created through minting may be directly used by the user, but may be sold to another user through the NFT market.

Figure 14:
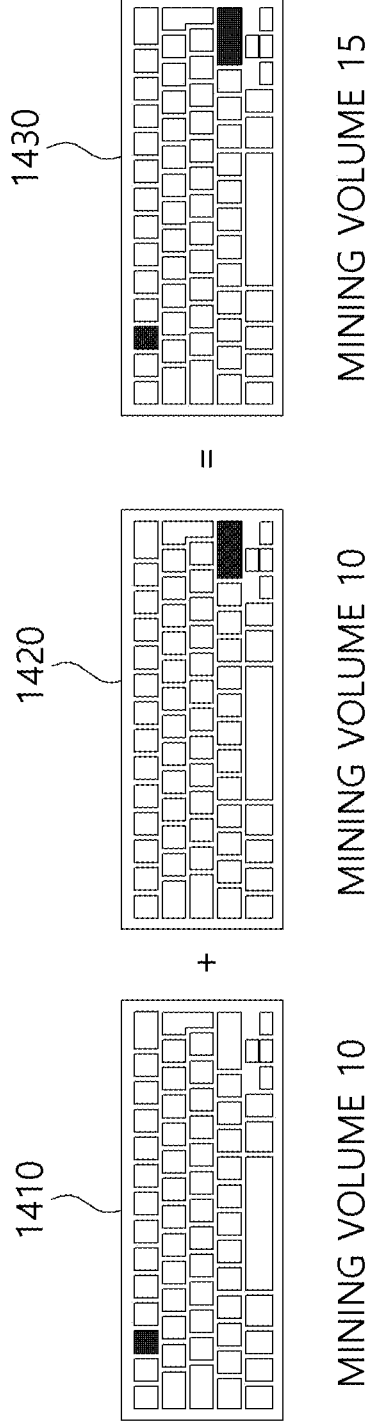
FIG. 14 is a view illustrating an example of keyboard NFT minting according to the present disclosure.

For example, in the case of minting using an NFT keyboard according to the present disclosure, a new keyboard NFT 1430 may be minted by combining two different keyboard NFTs 1410 and 1420 when the two different keyboards NFTs 1410 and 1420 are possessed by a user, as illustrated in FIG. 14. Here, because it is necessary to pay cryptocurrency in order to attempt minting, a certain amount of tokens in the digital wallet of the user may be burnt when minting is attempted. Also, minting may succeed with a preset probability of success, and a new keyboard NFT may be created only when minting succeeds.

In summary, the amount of cryptocurrency mining in each case may be as shown in FIG. 10.

That is, a user who uses a virtual keyboard to which a brand theme is applied may mine more cryptocurrency than a user who purchases a keyboard NFT and uses a virtual keyboard when the amount of keyboard usage is the same.

Also, in order to mine more cryptocurrency per hour of use, a user may lend his or her keyboard NFT to another user or may obtain the ownership of multiple NFTs by purchasing the NFTs or minting an NFT, whereby more cryptocurrency may be mined.

In the present disclosure, a word NFT may be issued separately from a keyboard NFT, and may then be used.

Here, a 'word NFT' may be a non-fungible token (NFT) that represents the ownership of each word that a user inputs through the virtual keyboard. Accordingly, the user having a specific word NFT may be provided with a reward depending on the amount of usage of the corresponding word.

For example, statistics on input words are collected in the application providing the virtual keyboard service, an amount of cryptocurrency obtainable in proportion to the amount of usage of each word is assigned to the owner of the word NFT of the word, and part of the cryptocurrency obtained through the word NFT may be provided depending on the ability of the keyboard NFT possessed by the owner of the word NFT.

TABLE 1

| word | usage | mining amount | price at which transaction is made |
|---|---|---|---|
| keyboard is | 10 | 0.001 coins | 1 coin |
| to keyboard | 20 | 0.002 coins | 2 coins |
| of keyboard | 50 | 0.005 coins | 5 coins |
| is keyboard | 100 | 0.01 coins | 10 coins |
| Keyboard | 300 | 0.03 coins | 30 coins |

As in the example in Table 1, the price at which each word NFT trades may be set in consideration of the amount of usage of the word. That is, a word NFT for a frequently used word trades at a high price, but a word NFT for a word that is relatively less used may trade at a low price.

Accordingly, the value of a word NFT may vary depending on issues, such as popularity of a specific word, an increase in the usage of a specific word, and the like.

Here, according to the present disclosure, when a user having a keyboard NFT also has a word NFT, the amount of cryptocurrency mining may increase. That is, when user A having only a keyboard NFT and user B having both a keyboard NFT and a word NET use virtual keyboards for the same amount of time, the amount of cryptocurrency mining by user B may be greater than that by user A.

Here, the maximum number of word NFTs capable of being mapped may be set depending on the grade of the keyboard NFT. That is, the number of word NFTs that can be possessed by a user may be set depending on the grade of the keyboard NFT possessed by the user.

For example, at most one word NFT may be mapped to the user having a keyboard NFT 610 of a normal grade, at most two word NFTs may be mapped to the user having a keyboard NFT 620 of a rare grade, and at most three word NFTs may be mapped to the user having a keyboard NFT 630 of a legend grade, as illustrated in FIG. 6. Accordingly, as the higher the grade of the keyboard NFT, the user may have more word NFTs, and the amount of cryptocurrency mining may also increase in proportion thereto.

Here, the amount of cryptocurrency mining increasing with an increase in the number of word NFTs may gradually decrease.

For example, assuming that, when one word NFT is possessed, one coin is mined depending on the amount of usage of the word corresponding thereto, settings may be made such that, when two word NFTs are possessed, 1.8 coins can be mined depending on the amount of usage of the words corresponding thereto and that, when three word NFTs are possessed, 2.4 coins can be mined depending on the amount of usage of the words corresponding thereto.

Here, similar to the keyboard NFT described above, concepts such as a purchase, lending, minting, a grade, and the like may be present for the word NFT.

For example, the ownership of a specific word may be obtained by purchasing a word NFT trading in an NFT market, and a user may acquire a higher level of word NFT with a certain probability by combining word NFTs possessed by the user. That is, describing an example of minting based on Table 1, a user having a word NFT corresponding to 'keyboard is' and a word NFT corresponding to 'of keyboard' attempts minting using the two word NFTs, thereby acquiring a word NFT corresponding to 'keyboard' that trades at a higher price.

Here, a minting success probability applied to minting of a word NFT may differ from that applied to minting of a keyboard NFT.

Also, the word NFT may have a concept of 'grade' similar to the keyboard NFT, and the grade of the word NFT may be set depending on the amount of usage of the word corresponding to the word NFT.

For example, the word NFT corresponding to 'keyboard', which is used the most as illustrated in Table 1, may have a high grade, and the word NFT corresponding to 'keyboard is' may be set to have a relatively low grade.

Through the above-described method for providing a virtual keyboard service that pays a cryptocurrency reward in consideration of an association between a keyboard NFT and a word NFT, a keyboard NFT and a word NFT, which have attributes associated with each other, are provided, whereby a user may be provided with a cryptocurrency reward while using a virtual keyboard.

Also, Communication To Earn (C2E), that is, a service through which users are able to make money by communicating with each other, is provided, whereby a service capable of incentivizing family members, friends, and acquaintances to actively communicate with each other and providing benefits therethrough may be provided.

Also, a virtual keyboard service in which blockchain technology is introduced into virtual keyboards used in user terminals is provided, whereby distinctive customer benefits and experiences may be provided, compared to a conventional virtual keyboard service that offers points as a reward.

Also, beyond the simple use of virtual keyboards for terminals by many users, more various benefits may be provided depending on the amount of usage of the virtual keyboards.

Also, the structure of a virtual keyboard service paying a cryptocurrency reward is designed so as to enable the transition to or from a virtual keyboard service through which points can be saved, whereby a large number of customers may be effectively secured.

Figure 15:
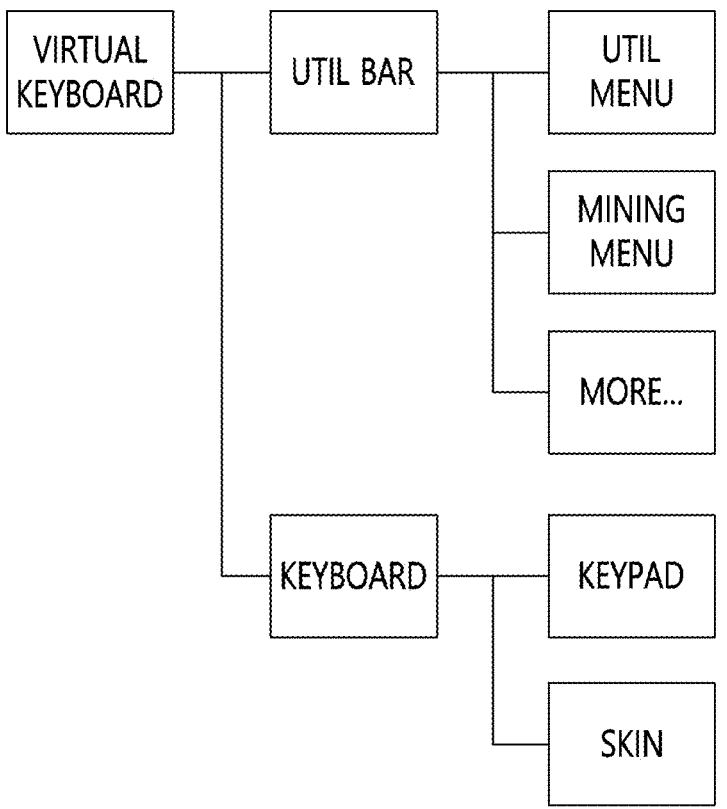
FIG. 15 is a view illustrating an example of functions provided through a virtual keyboard according to the present disclosure.

FIG. 15 is a view illustrating an example of functions provided through a virtual keyboard according to the present disclosure.

Referring to FIG. 15, a virtual keyboard according to the present disclosure may be divided into a utility bar for providing utilities and a keyboard based on a keypad, which is the most basic function.

Here, the utility bar may provide functions classified into a utility menu, a mining menu, and the like, and the keyboard may provide functions classified into a keypad and a skin.

FIGS. 16 to 22 are views illustrating examples of functions provided through an application according to the present disclosure.

Figure 16:
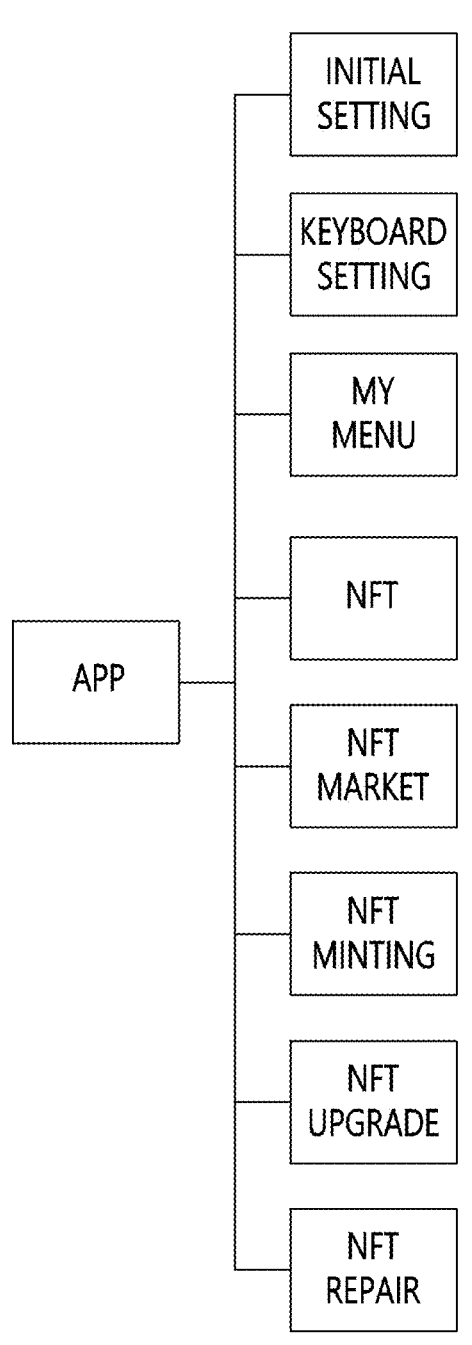
FIGS. 16 to 22 are views illustrating examples of functions provided through an application according to the present disclosure.
Figure 17:
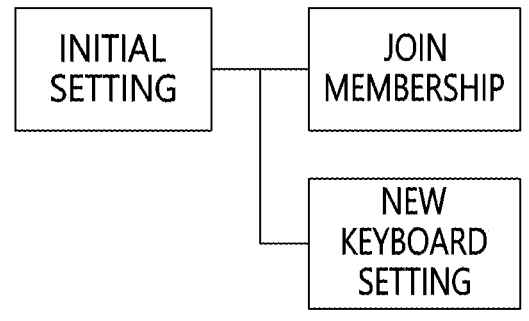
Figure 18:
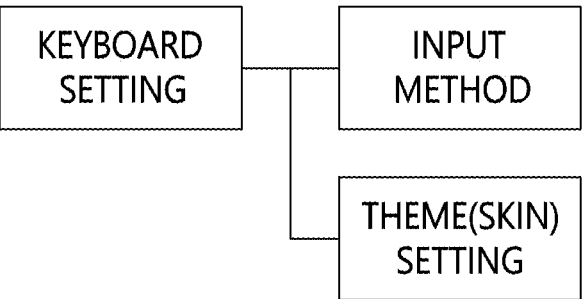
Figure 19:
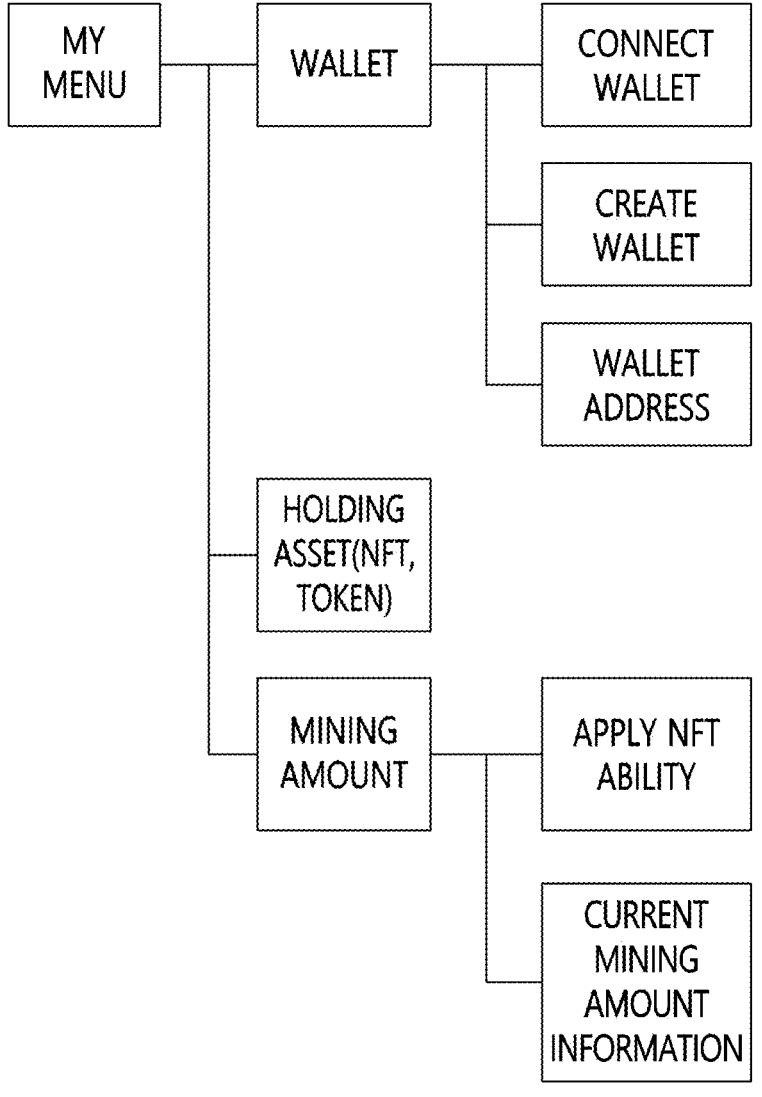
Figure 20:
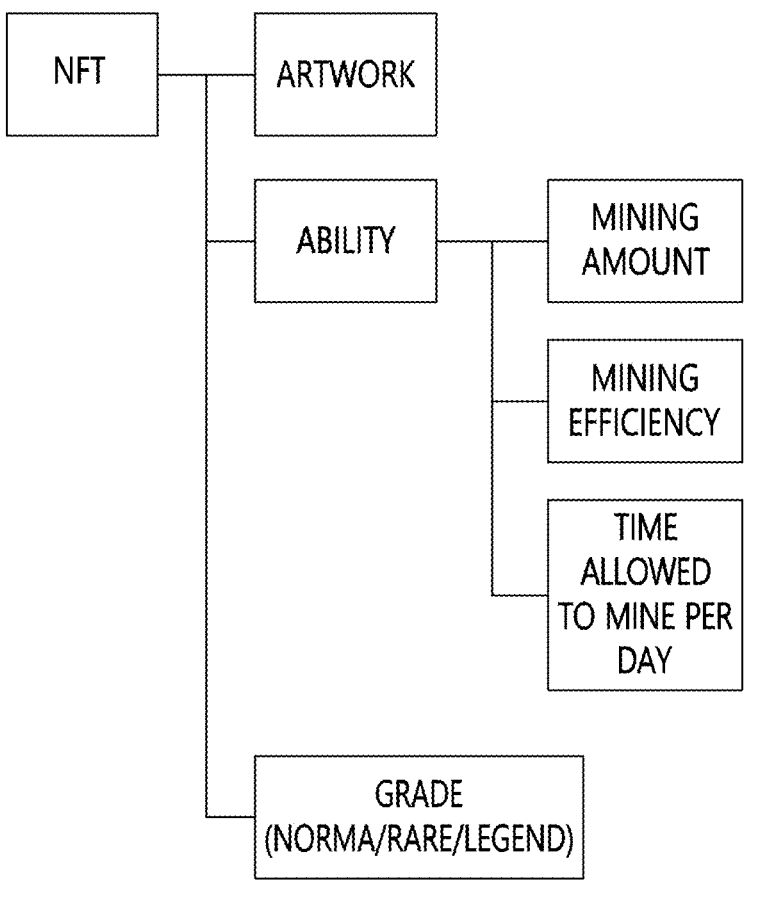
Figure 21:
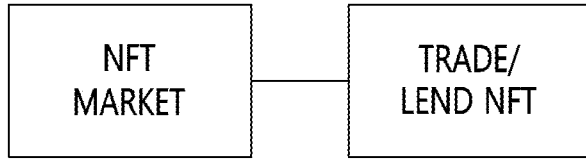
Figure 22:
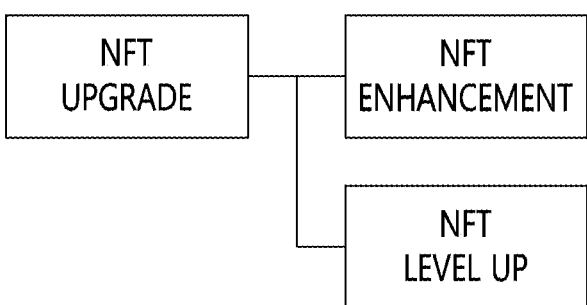

First, referring to FIG. 16, an application for providing a virtual keyboard service according to the present disclosure may provide functions represented as menu items, including initial settings, keyboard settings, My menu, NFT, NFT market, NFT minting, NFT upgrade, NFT repair, and the like.

Here, 'initial settings' may provide functions for joining a membership, setting a new keyboard, and the like, and 'keyboard settings' may provide functions related to an input method, theme (skin) settings, and the like.

Also, functions related to a wallet, holding assets, a mining amount, and the like may be provided through 'My menu'. Here, functions for a connection with a wallet, creation of a wallet, a wallet address, and the like may be provided for the wallet, and a function for applying an NFT ability, information about the current mining amount, and the like may be provided in connection with the mining amount.

Also, functions related to artwork, an ability, a grade, and the like may be provided through 'NFT', and information about the efficiency, durability, and degree of fatigue of an NFT may be provided in connection with the ability.

Also, functions for the transaction, rental, sale, and the like of NFTs may be provided through 'NFT market', and NFT enhancement or level-up may be performed through 'NFT upgrade'.

Figure 23:
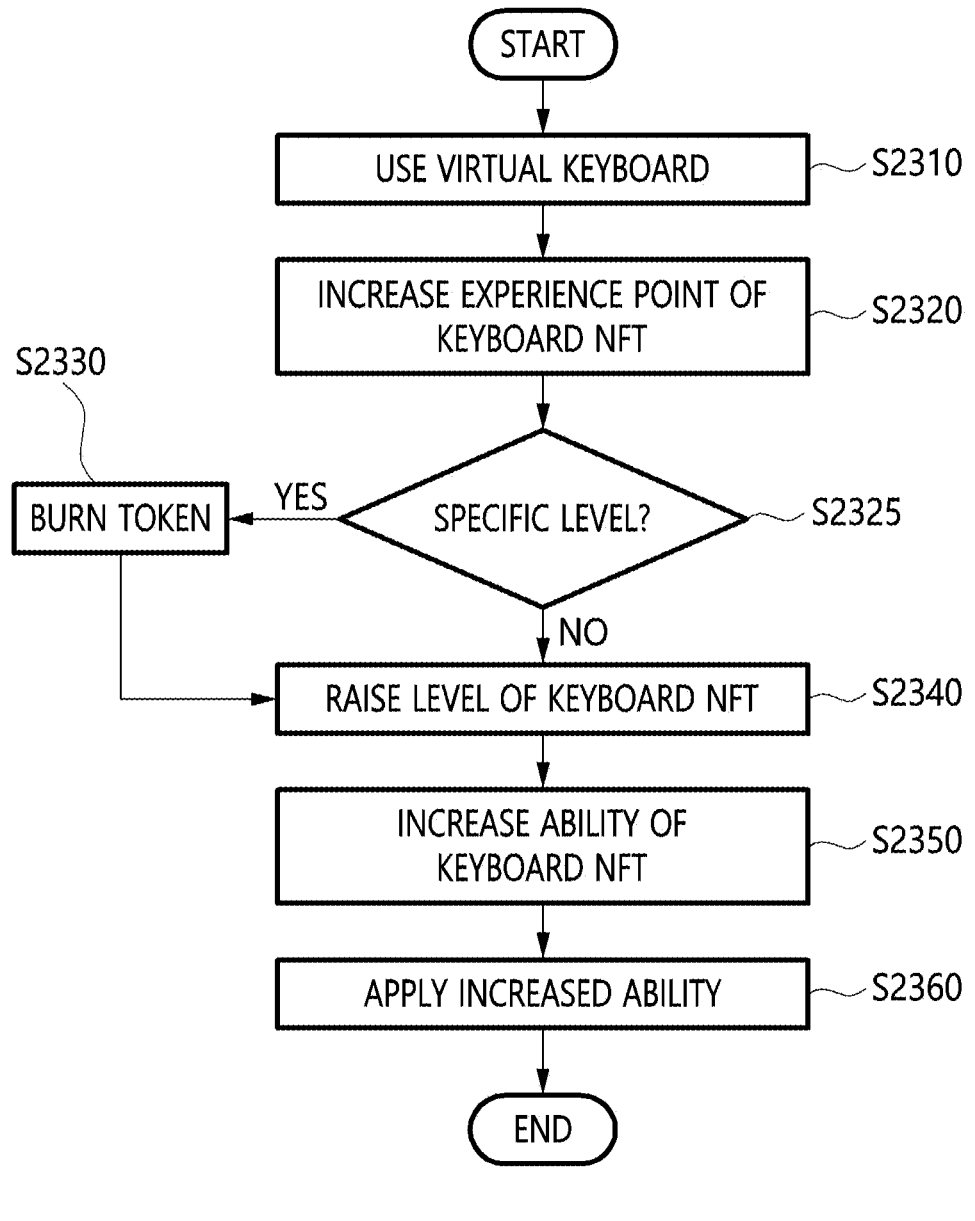
FIG. 23 is a flowchart illustrating in detail a process of raising the level of a keyboard NFT in a method for providing a virtual keyboard service according to an embodiment of the present disclosure.

FIG. 23 is a flowchart illustrating in detail a process of raising the level of a keyboard NFT in a method for providing a virtual keyboard service according to an embodiment of the present disclosure.

Referring to FIG. 23, when a user having a keyboard NFT uses a virtual keyboard at step S2310, the experience points of the keyboard NFT may be increased depending on the amount of usage of the virtual keyboard at step S2320.

Subsequently, when level-up is attempted in response to a request from a user to raise a level, whether the current level of the keyboard NFT is a specific level may be determined at step S2325.

When it is determined at step S2325 that the current level of the keyboard NFT is the specific level, the user is requested to pay tokens and the tokens are burnt at step S2330, after which the level of the keyboard NFT may be raised at step S2340.

Also, when it is determined at step S2325 that the current level of the keyboard NFT is not the specific level, the level of the keyboard NFT may be raised at step S2340 without requesting the user to pay tokens.

Subsequently, when the attribute of the keyboard NFT is increased based on stat points that are given thanks to the raised level of the keyboard NFT, the ability of the keyboard NFT is increased based thereon at step S2350, and the increased ability of the keyboard NFT may be applied at step S2360 when cryptocurrency is mined depending on the use of the virtual keyboard.

Figure 24:
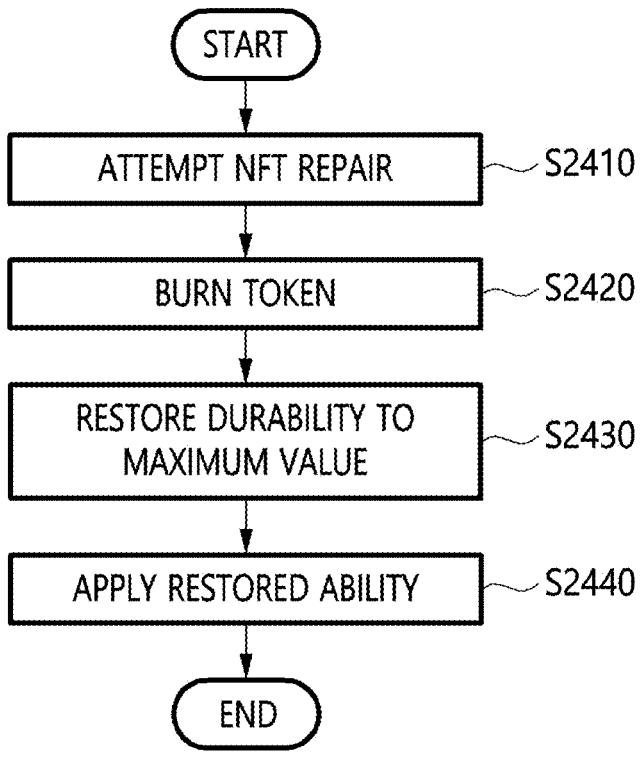
FIG. 24 is a flowchart illustrating in detail a process of restoring the durability of a keyboard NFT in a method for providing a virtual keyboard service according to an embodiment of the present disclosure.

FIG. 24 is a flowchart illustrating in detail a process of restoring the durability of a keyboard NFT in a method for providing a virtual keyboard service according to an embodiment of the present disclosure.

Referring to FIG. 24, when a user attempts to restore the durability of a keyboard NFT at step S2410, a request to pay cryptocurrency for restoring the durability is made to the user, and as many tokens as requested may be burnt at step S2420.

Subsequently, when it is confirmed that the tokens are burnt, the durability of the keyboard NFT may be restored to the default value thereof, that is, the maximum value thereof, at step S2430, and the ability of the keyboard NFT may be restored depending on the restored durability at step S2440.

Figure 25:
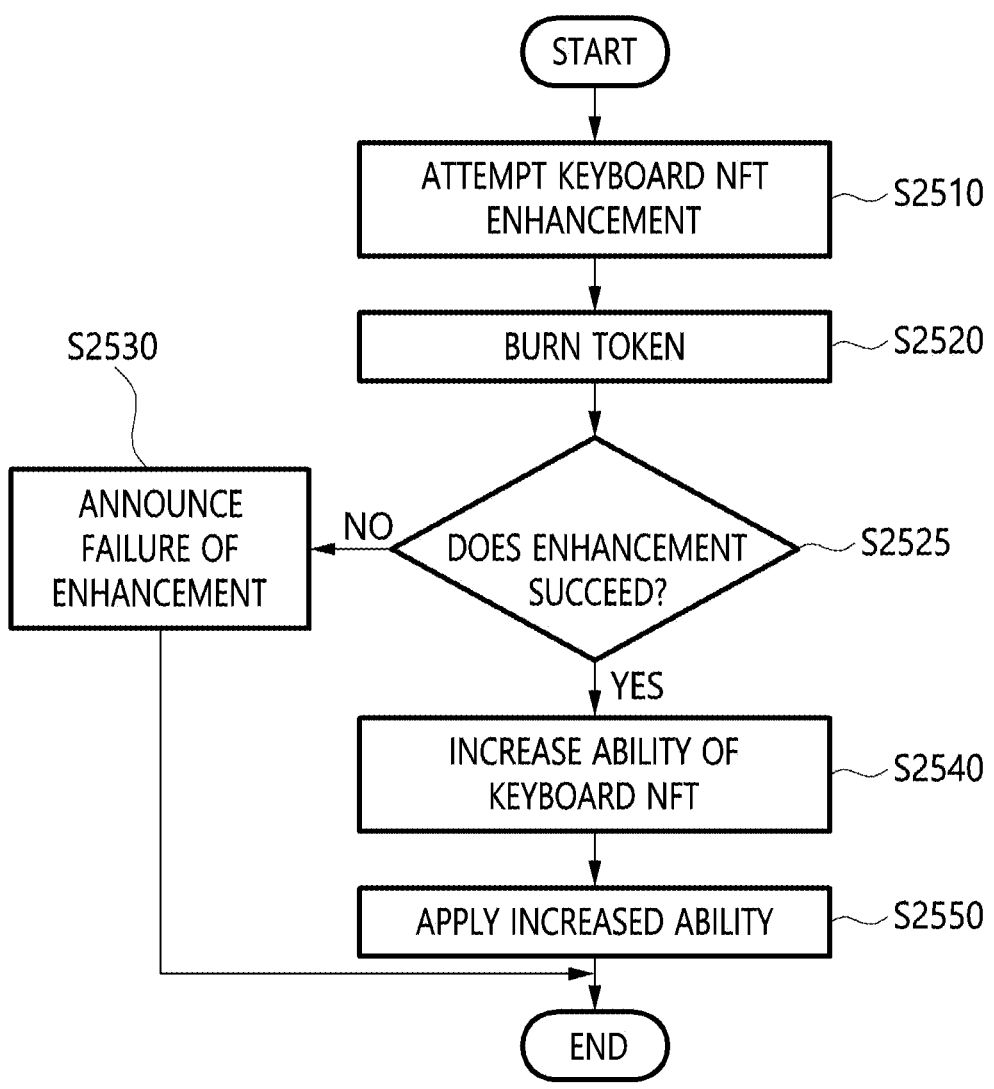
FIG. 25 is a flowchart illustrating in detail a process of enhancing a keyboard NFT in a method for providing a virtual keyboard service according to an embodiment of the present disclosure.

FIG. 25 is a flowchart illustrating in detail a process of enhancing a keyboard NFT in a method for providing a virtual keyboard service according to an embodiment of the present disclosure.

Referring to FIG. 25, when a user attempts to enhance a keyboard NFT at step S2510, a request to pay cryptocurrency for enhancing the keyboard NFT is made to the user, and as many tokens as requested may be burnt at step S2520.

Here, whether the number of times available for enhancement that is given to the keyboard NFT requested to be enhanced is not zero is checked, and the request to pay cryptocurrency may be made only when the number of times available for enhancement is not zero.

Subsequently, when it is confirmed that the tokens are burnt, enhancement of the keyboard NFT is performed with a preset probability of success of enhancement, after which whether enhancement succeeds may be determined at step S2525.

When it is determined at step S2525 that enhancement succeeds, the ability of the keyboard NFT is increased by increasing the attribute of the keyboard NFT at step S2540, and the increased ability of the keyboard NFT may be applied when cryptocurrency is mined depending on the use of the virtual keyboard at step S2550.

Here, the number of times available for enhancement given to the corresponding keyboard NFT may decrease by 1 when enhancement of the keyboard NFT succeeds.

Also, when it is determined at step S2525 that enhancement fails, the failure may be announced to the user at step S2530, and the process may be terminated.

Figure 26:
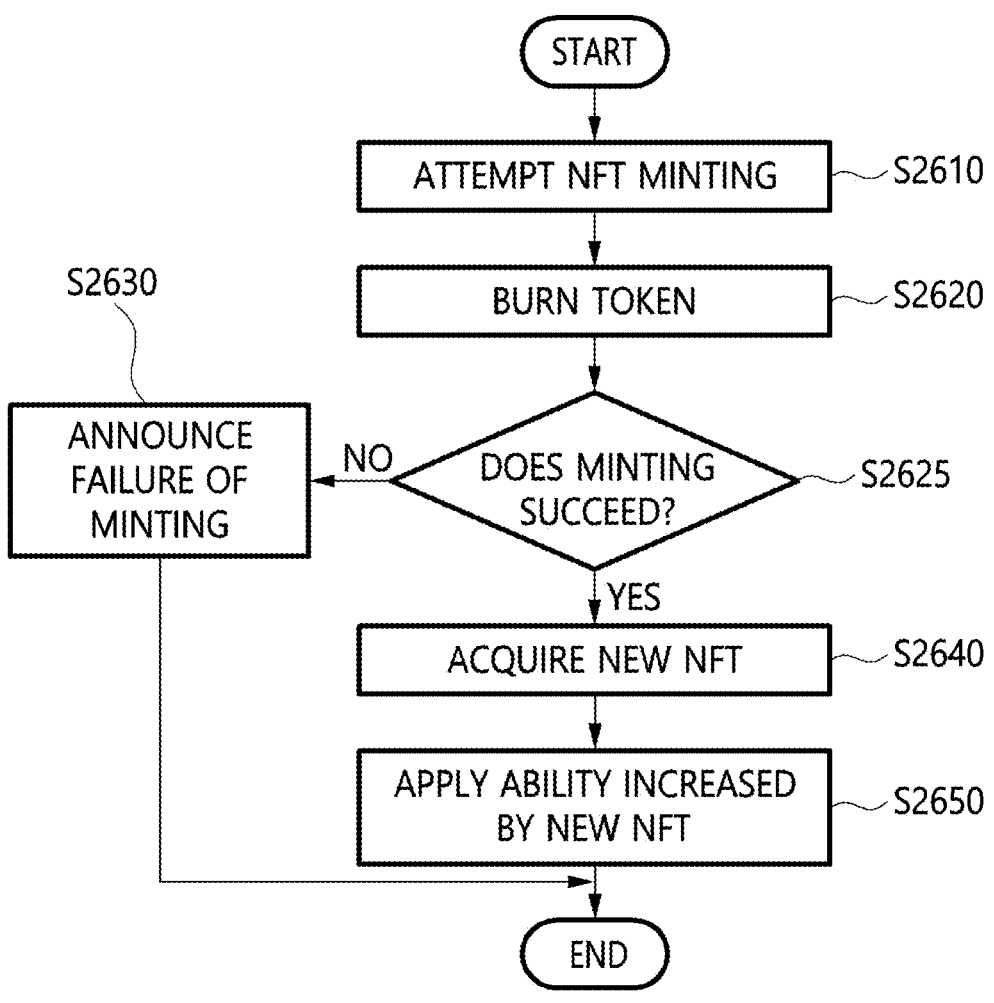
FIG. 26 is a flowchart illustrating in detail a minting process in a method for providing a virtual keyboard service according to an embodiment of the present disclosure.

FIG. 26 is a flowchart illustrating in detail a minting process in a method for providing a virtual keyboard service according to an embodiment of the present disclosure.

Referring to FIG. 26, when a user attempts to mint a keyboard NFT at step S2610, a request to pay cryptocurrency for minting the keyboard NFT is made to the user, and as many tokens as requested may be burnt at step S2620.

Subsequently, when it is confirmed that the tokens are burnt, minting a keyboard NFT is performed with a preset probability of success of minting, and whether minting succeeds may be determined at step S2625.

When it is determined at step S2625 that minting succeeds, a new keyboard NFT created through minting is provided to the user at step S2640, and the ability of the keyboard NFT increased by the new keyboard NFT may be applied when cryptocurrency is mined depending on the use of the virtual keyboard at step S2650.

Also, when it is determined at step S2625 that minting fails, the failure may be announced to the user at step S2630, and the process may be terminated.

Figure 27:
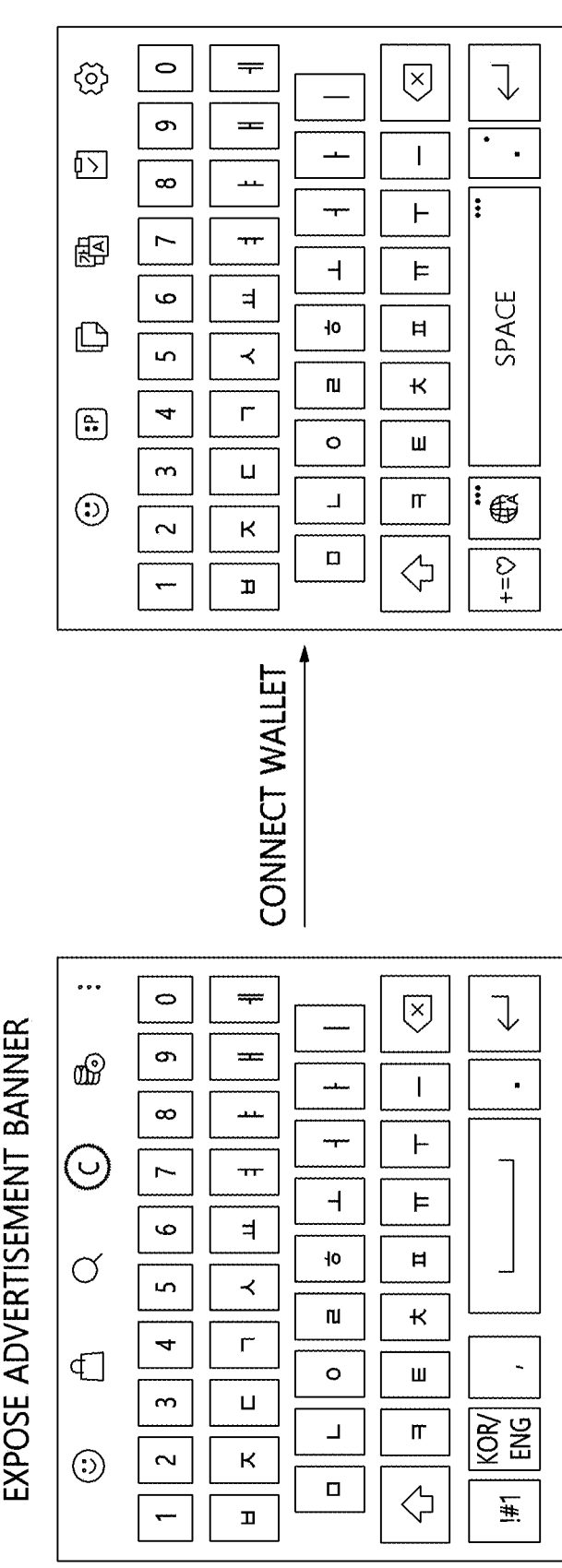
FIGS. 27 to 28 are views illustrating examples of a process of transitioning from a virtual keyboard service in point mode to a virtual keyboard service in a cryptocurrency mining mode according to the present disclosure.
Figure 28:
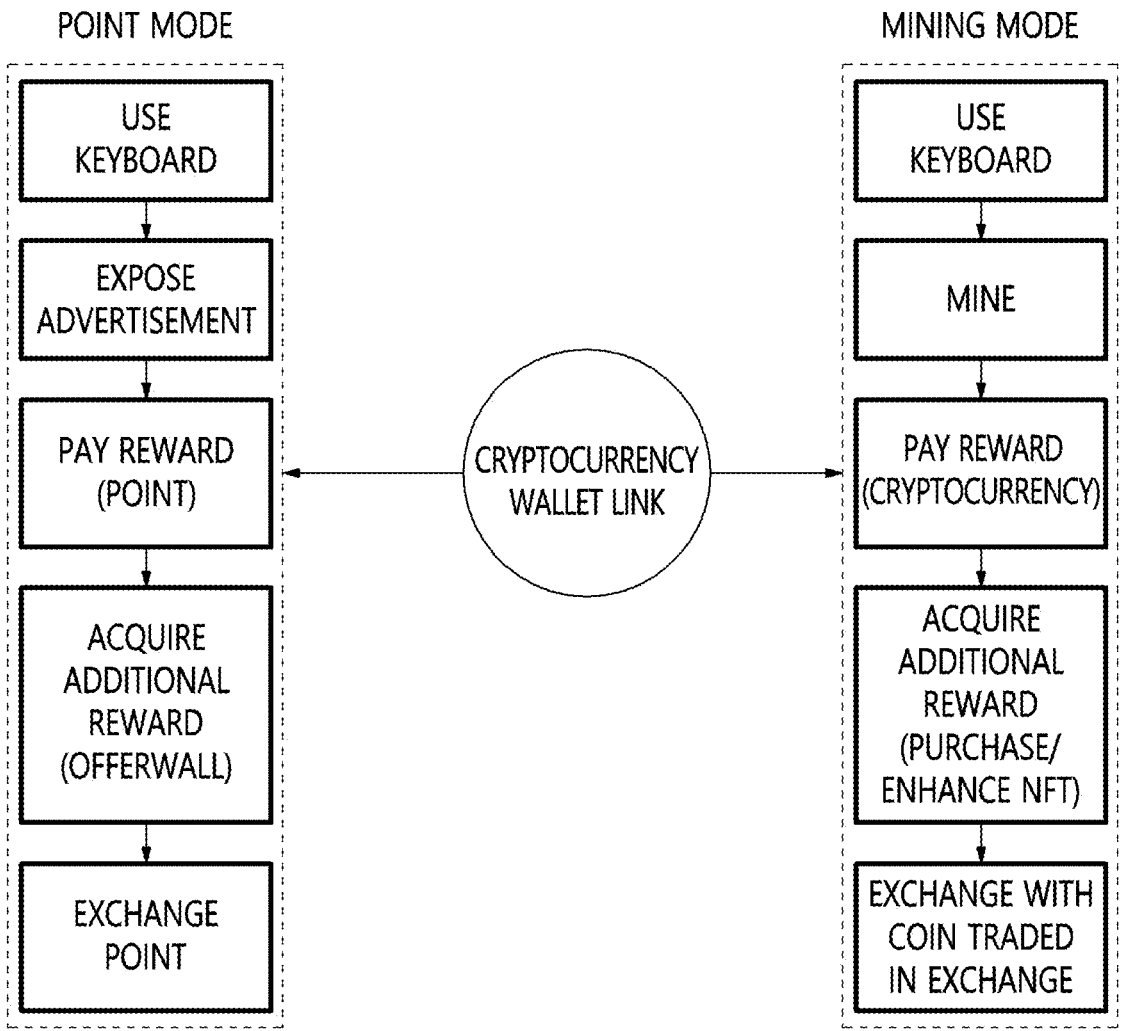

FIGS. 27 to 28 are views illustrating examples of a process of transitioning from a virtual keyboard service in a point mode to a virtual keyboard service in a cryptocurrency mining mode according to the present disclosure.

First, referring to FIG. 27, an example in which a virtual keyboard in a point mode is transitioned to a virtual keyboard in a cryptocurrency mining mode according to the service transition is illustrated.

For example, the virtual keyboard service in the point mode may expose an advertisement on the virtual keyboard while a user is using the virtual keyboard, as illustrated in FIG. 28. When the advertisement is exposed on the virtual keyboard, points may be paid as a reward, and additional rewards may also be provided through events selected by the user, such as an offerwall, daily login, application of a brand theme, and the like. The accumulated rewards, that is, the points, may be exchanged with points that can be used as money in a specific application or a specific medium.

Referring to FIG. 28, when the virtual keyboard service in the point mode is transitioned to the virtual keyboard service in the cryptocurrency mining mode, the digital wallet of the user is connected, whereby the form of rewards may change from points to cryptocurrency. The cryptocurrency may be used by being exchanged with various kinds of coins through an exchange.

Also, after the service is transitioned, cryptocurrency may be mined while the user is using a virtual keyboard based on the purchase of a keyboard NFT.

Here, the virtual keyboard service in the point mode and the virtual keyboard service in the cryptocurrency mining mode may be provided through different applications, and the membership systems thereof may also be managed separately from each other. Also, when a user requests the transition of the service mode, the service may be transitioned from the point mode to the cryptocurrency mining mode, and when the user makes no request, the service may not be transitioned.

Figure 29:
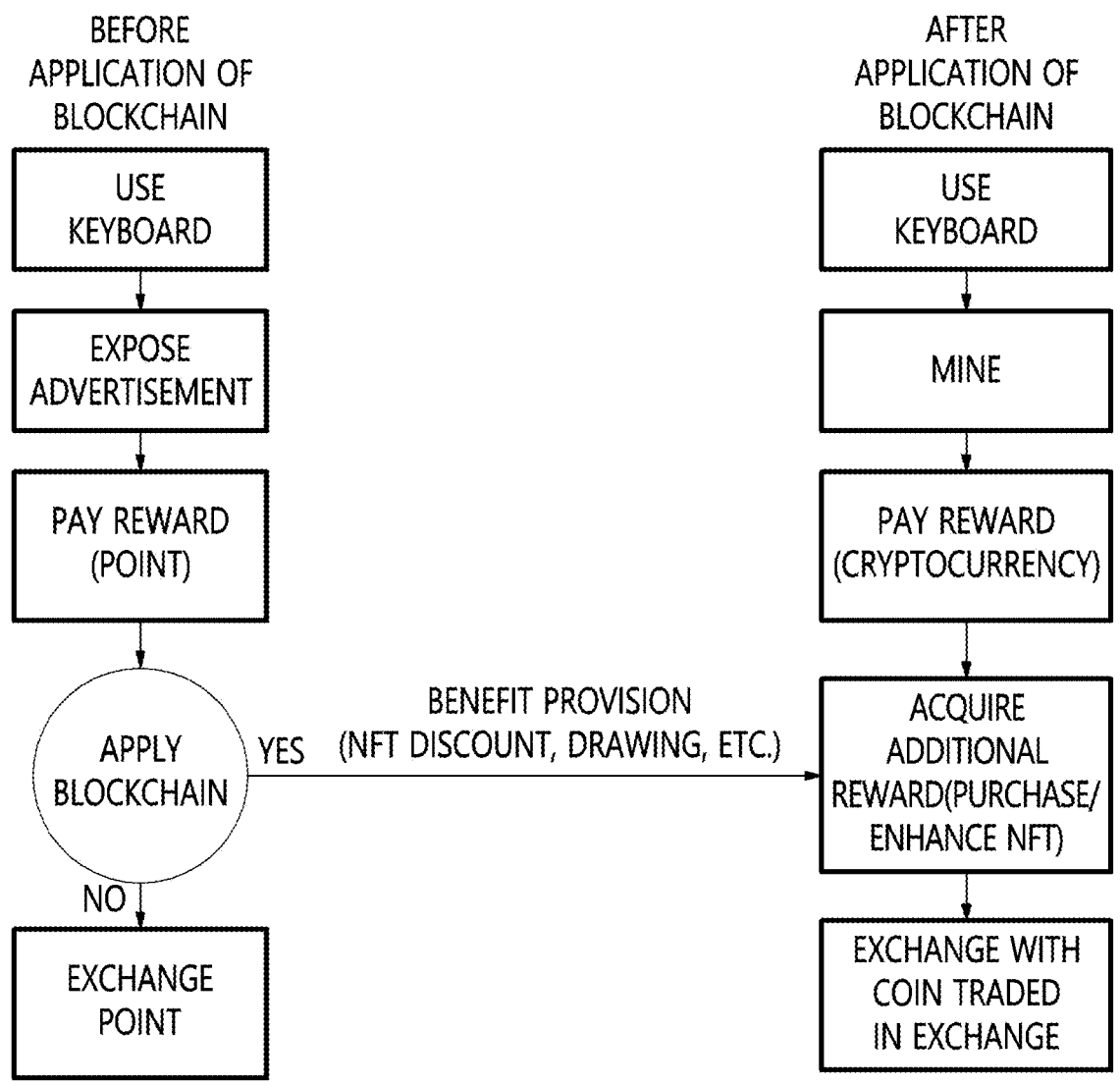
FIG. 29 is a view illustrating an example of a process of transitioning from a service to which blockchain is not applied to a service to which blockchain is applied according to the present disclosure.

FIG. 29 is a view illustrating an example of a process of transitioning a service to which blockchain is not applied to a service to which blockchain is applied according to the present disclosure.

Referring to FIG. 29, a process in which a virtual keyboard service in a point mode, such as that illustrated in FIG. 28, is transitioned to a virtual keyboard service in a cryptocurrency mining mode depending on the selection by a user is illustrated.

Here, when the service is transitioned, different benefits may be paid depending on the points accumulated by using the virtual keyboard service in the point mode.

For example, when the service is used after application of blockchain, a discount on the costs to be paid in cryptocurrency for attempting NFT minting may be given, or benefits, such as priority, may be given when an event such as a draw occurs.

Also, when it is impossible to transition from the virtual keyboard service to which blockchain is not applied to the virtual keyboard service to which blockchain is applied, as illustrated in FIG. 29, the saved points may be exchanged with points that can be used like money in a specific application or a specific medium.

Figure 30:
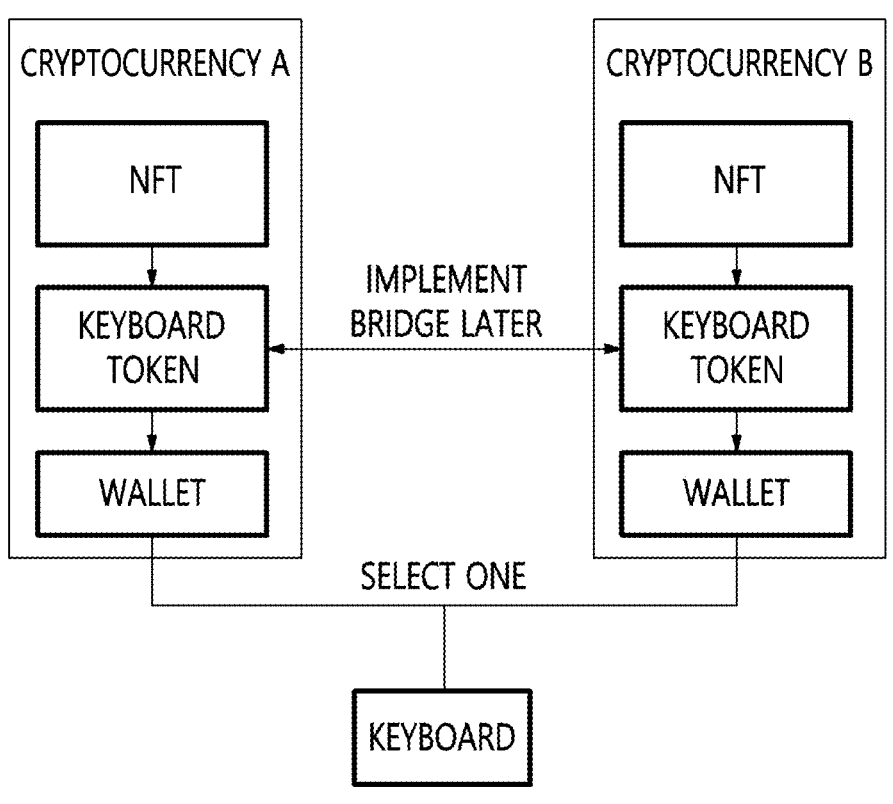
FIG. 30 is a view illustrating an example of a process of selectively providing a type of cryptocurrency according to the present disclosure.

FIG. 30 is a view illustrating an example of a process of selectively providing the type of cryptocurrency according to the present disclosure.

Referring to FIG. 30, the present disclosure may provide a service in an extended form such that various kinds of external coins are supported through a virtual keyboard service.

For example, NFTs may be respectively issued on the chain corresponding to cryptocurrency A and the chain corresponding to cryptocurrency B, as illustrated in FIG. 30, and keyboard tokens may also be issued as keyboard tokens of cryptocurrency A and keyboard tokens of cryptocurrency B.

Accordingly, a service may be configured such that the NFT on the chain of cryptocurrency A is purchased for cryptocurrency A and the NFT on the chain of cryptocurrency B is purchased for cryptocurrency B.

Then, the service may be extended such that various coins can be supported in the service through a bridge between the keyboard tokens issued on the respective chains, as illustrated in FIG. 30.

Figure 31:
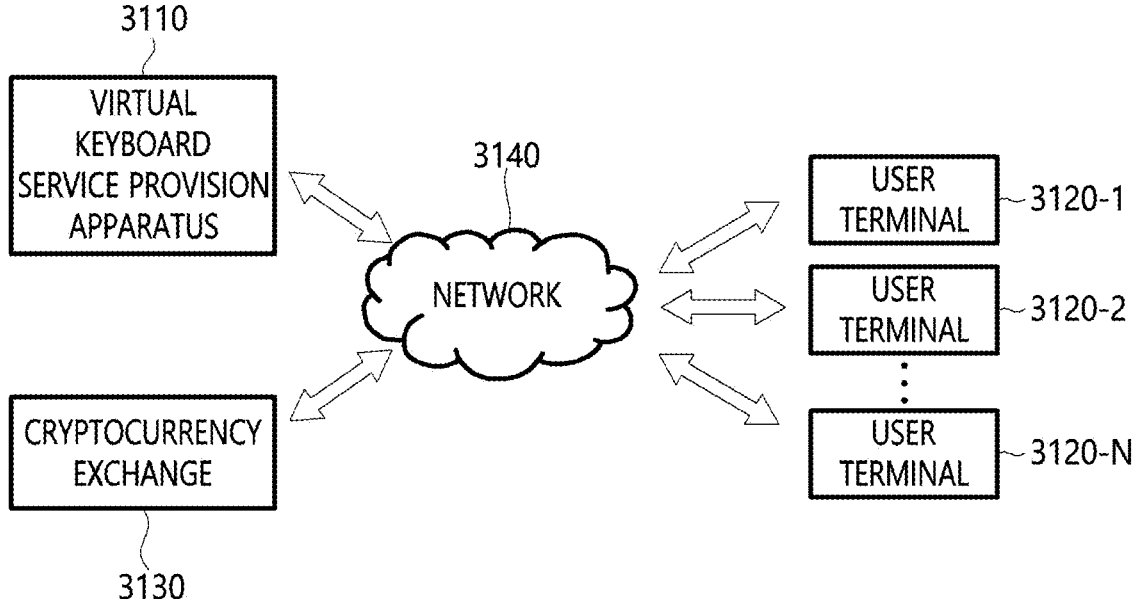
FIG. 31 is a view illustrating an example of a system for providing a virtual keyboard service that pays a cryptocurrency reward in consideration of an association between a keyboard NFT and a word NFT according to an embodiment of the present disclosure.

FIG. 31 is a view illustrating an example of a system for providing a virtual keyboard service that pays a cryptocurrency reward in consideration of an association between a keyboard NFT and a word NFT according to an embodiment of the present disclosure.

Referring to FIG. 31, the system for providing a virtual keyboard service that pays a cryptocurrency reward in consideration of an association between a keyboard NFT and a word NFT according to an embedment of the present disclosure includes a virtual keyboard service provision apparatus 3110, user terminals 3120-1 to 3120-N, a cryptocurrency exchange 3130, and a network 3140.

The virtual keyboard service provision apparatus 3110 monitors the use of a virtual keyboard by a user who has a keyboard NFT based on an application.

Also, the virtual keyboard service provision apparatus 3110 measures the ability of the keyboard NFT in consideration of an attribute of the keyboard NFT that changes depending on the amount of usage of the virtual keyboard.

Here, the attribute of the keyboard NFT may include efficiency, which is a positive attribute having a value increasing based on the amount of usage, and durability, which is a negative attribute having a value decreasing based on the amount of usage.

Here, the ability of the keyboard NFT may correspond to a value acquired by applying the percentage of the current remaining durability, which is calculated based on the default value of the durability, to the amount of usage multiplied by the efficiency.

Here, an amount of cryptocurrency corresponding to the ability may be mined at each preset unit time while the virtual keyboard is being used.

Here, the default value of the attribute of the keyboard NFT may be set differently depending on the grade of the keyboard NFT.

Here, the efficiency may be increased using stat points that are given when the level of the keyboard NFT is raised based on experience points that are provided to correspond to the amount of usage.

Here, the durability decreases with an increase in the amount of usage, but may be restored to the default value thereof when cryptocurrency is paid for restoring the durability.

Also, the virtual keyboard service provision apparatus 3110 stops cryptocurrency mining when the degree of fatigue of the keyboard NFT becomes the maximum value thereof or when the time allowed for the user to mine per day has elapsed.

Here, when cryptocurrency is paid for restoring the degree of fatigue or the time allowed to mine per day, the degree of fatigue or the time allowed to mine per day may be restored to the default value thereof.

Also, when cryptocurrency is paid for enhancing the keyboard NFT, the virtual keyboard service provision apparatus 3110 enhances the keyboard NFT in consideration of the number of times available for enhancement given to correspond to the grade of the keyboard NFT and a preset probability of success of enhancement.

Here, when enhancing the keyboard NFT succeeds, the default value of the attribute of the keyboard NFT may be increased.

Here, the higher the grade of the keyboard NFT, the greater the number of times available for enhancement.

Also, the virtual keyboard service provision apparatus 3110 mines an amount of cryptocurrency corresponding to the ability of the keyboard NFT while the virtual keyboard is being used.

Also, the virtual keyboard service provision apparatus 3110 pays the mined cryptocurrency to the user as a reward.

Also, the virtual keyboard service provision apparatus 3110 gives a weight to the ability of the keyboard NFT in consideration of whether a brand theme is applied.

Also, the virtual keyboard service provision apparatus 3110 pays cryptocurrency to the user as a reward for lending the keyboard NFT.

Also, when cryptocurrency is paid for minting, the virtual keyboard service provision apparatus 3110 combines two different types of keyboard NFTs possessed by the user, and provides a new type of keyboard NFT created through the combination to the user when minting succeeds with a preset probability of success of minting.

Each of the user terminals 3120-1 to 3120-N may access an NFT market via an application that a user is provided from the virtual keyboard service provision apparatus 3110, and may activate a virtual keyboard based on a keyboard NFT purchased from the NFT market.

The virtual keyboard based on the keyboard NFT is activated as described above, whereby cryptocurrency may be mined when the user is using the virtual keyboard while communicating with other people.

For example, the user terminals 3120-1 to 3120-N may be devices capable of running an application according to the present disclosure by being connected to a communication network, and may be any of various types of terminals including all types of information communication devices, multimedia terminals, Internal Protocol (IP) terminals, and the like, rather than being limited to mobile communication terminals. Also, the user terminal may be a mobile terminal compliant with any of various mobile communication specifications, such as a mobile phone, a Portable Multimedia Player (PMP), a Mobile Internet Device (MID), a smartphone, a tablet PC, a laptop, a net book, a Personal Digital Assistant (PDA), an information communication device, or the like.

Also, each of the user terminals 3120-1 to 3120-N may receive various kinds of information, such as numbers, letters, and the like, and may transfer signals that are input in connection with settings of various functions and control of the functions of the user terminal to the control unit thereof via the input unit thereof. Also, the input unit of each of the user terminals 3120-1 to 3120-N may be formed by including at least one of a keypad, or a touch pad, or a combination thereof, which generates an input signal in response to a touch or manipulation by a user. Here, the input unit of each of the user terminals 3120-1 to 3120-N and the display unit thereof are configured in the form of a single touch panel (or a touch screen), thereby performing both an input function and a display function. Also, the input unit of each of the user terminals 3120-1 to 3120-N may use not only input devices, such as a keyboard, a keypad, a mouse, a joystick, and the like, but also all types of input means to be developed in the future.

Also, the display unit of each of the user terminals 3120-1 to 3120-N may display information about a series of operation states and operation results, which is generated when the user terminal performs a function. Also, the display unit of each of the user terminals 3120-1 to 3120-N may display the menu thereof, user data input by a user, and the like. Here, the display unit of each of the user terminals 3120-1 to 3120-N may be configured as a Liquid Crystal Display (LCD), a Thin Film Transistor LCD (TFT-LCD), a Light-Emitting Diode (LED), an Organic LED (OLED), an Active Matrix OLED (AMOLED), a retina display, a flexible display, a 3-dimensional display, or the like. Here, when the display unit of each of the user terminals 3120-1 to 3120-N is configured in the form of a touch screen, the display unit of the user terminal may perform some or all of the functions of the input unit thereof. Particularly, the display unit of each of the user terminals 3120-1 to 3120-N according to the present disclosure may display an interface provided for providing a cryptocurrency reward using a keyboard NFT and information about execution of an application on the screen.

Also, the storage unit of each of the user terminals 3120-1 to 3120-N may include a main storage device and an auxiliary storage device as devices for storing data, and may store applications required for performing the functions of the user terminal. The storage unit of each of the user terminals 3120-1 to 3120-N may include a program area and a data area. Here, when each of the user terminals 3120-1 to 3120-N activates each function in response to a request from a user, the user terminal provides the function by running corresponding applications under the control of the control unit. Particularly, the storage unit of each of the user terminals 3120-1 to 3120-N according to the present disclosure may store an Operating System (OS) for booting the user terminal, an application for providing a cryptocurrency reward, and the like. Also, the storage unit of each of the user terminals 3120-1 to 3120-N may store information about the user terminal. Here, the information about each of the user terminals 3120-1 to 3120-N may include terminal specification information.

Also, the communication unit of each of the user terminals 3120-1 to 3120-N may perform functions for transmitting and receiving data to and from the virtual keyboard service provision apparatus 3110 or the cryptocurrency exchange 3130 via the network 3140. Here, the communication unit of each of the user terminals 3120-1 to 3120-N may include an RF transmission means for up-conversion and amplification of the frequency of the signal to be transmitted and an RF reception means for low-noise amplification of a received signal and down-conversion of the frequency thereof. Such a communication unit of each of the user terminals 3120-1 to 3120-N may include a wireless communication module. The wireless communication module is a component for transmitting and receiving data based on a wireless communication method, and when the user terminals 3120-1 to 3120-N use wireless communication, they may transmit and receive data to and from the virtual keyboard service provision apparatus 3110 or the cryptocurrency exchange 3130 using any one of a wireless network communication module, a wireless LAN communication module, and a wireless PAN communication module. That is, the user terminals 3120-1 to 3120-N may access the network 3140 using the wireless communication module, and may transmit and receive data to and from the virtual keyboard service provision apparatus 3110 or the cryptocurrency exchange 3130 via the network 3140. Particularly, the network 3140 according to the present disclosure communicates with the virtual keyboard service provision apparatus 3110, the cryptocurrency exchange 3130, or the user terminals 3120-1 to 3120-N, thereby transmitting and receiving data required for providing a cryptocurrency reward.

Also, the control unit of each of the user terminals 3120-1 to 3120-N may be a processing device for running an Operating System (OS) and respective components. For example, the control unit may control the overall process of accessing the virtual keyboard service provision apparatus 3110 or the cryptocurrency exchange 3130. When access to the virtual keyboard service provision apparatus 3110 or the cryptocurrency exchange 3130 is made through an application, the control unit may control the overall process of running the application in response to a request from a user, and may perform control so as to transmit a request to use a service to the virtual keyboard service provision apparatus 3110 or the cryptocurrency exchange 3130 at the time of execution of the application. Here, the control unit may perform control such that information about the user terminal required for user authentication is transmitted along with the request.

The cryptocurrency exchange 3130 may be a server for the transition or exchange between cryptocurrency and flat currency.

For example, cryptocurrency that is mined whereby a user uses a virtual keyboard based on a keyboard NFT may be stored in the digital wallet of each of the user terminals 3120-1 to 3120-N. The stored cryptocurrency may be changed to a different kind of cryptocurrency or exchanged with flat currency through the cryptocurrency exchange 3130.

The network 3140 may provide a channel via which data is transferred between the virtual keyboard service provision apparatus 3110, the cryptocurrency exchange 3130, and the user terminals 3120-1 to 3120-N, and may be conceptually understood as including all of networks that are currently being used and networks that have yet to be developed. For example, the network may be any one of wired/wireless local area networks for providing communication between various kinds of data devices in a limited area, a mobile communication network for providing communication between mobile devices or between a mobile device and the outside thereof, a satellite communication network for providing communication between earth stations using a satellite, and wired/wireless communication networks, or may be a combination of two or more selected therefrom. Meanwhile, a transmission protocol standard for the network is not limited to existing transmission protocol standards, but may include all transmission protocol standards to be developed in the future.

Figure 32:
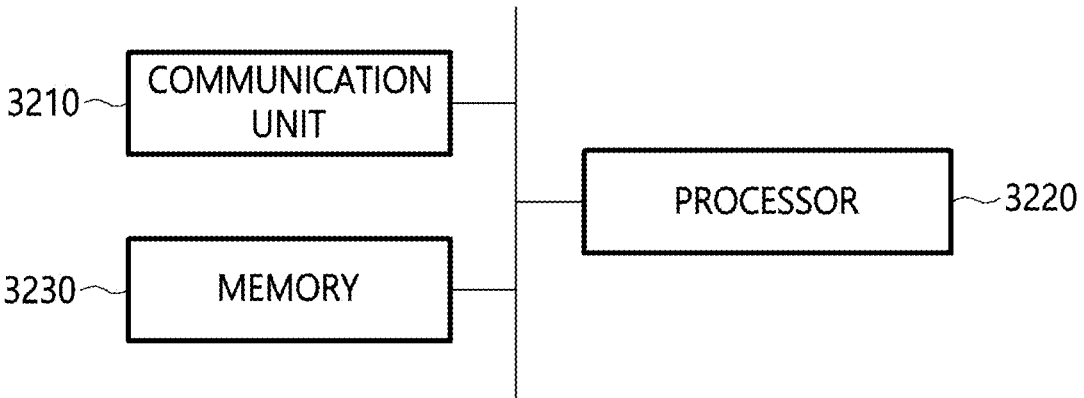
FIG. 32 is a block diagram illustrating an example of an apparatus for providing a virtual keyboard service that pays a cryptocurrency reward in consideration of an association between a keyboard NFT and a word NFT according to an embodiment of the present disclosure.

FIG. 32 is a block diagram illustrating an example of an apparatus for providing a virtual keyboard service that pays a cryptocurrency reward in consideration of an association between a keyboard NFT and a word NFT according to an embodiment of the present disclosure.

Referring to FIG. 32, the apparatus for providing a virtual keyboard service that pays a cryptocurrency reward in consideration of an association between a keyboard NFT and a word NFT according to an embodiment of the present disclosure includes a communication unit 3210, a processor 3220, and memory 3230.

The communication unit 3210 serves to transmit and receive information required for providing a virtual keyboard service that pays a cryptocurrency reward in consideration of an association between a keyboard NFT and a word NFT through a communication network. Particularly, the communication unit 3210 according to an embodiment of the present disclosure may receive data on the cryptocurrency to be paid to a user from the virtual keyboard service provision apparatus or the cryptocurrency exchange in real time.

The processor 3220 monitors the use of a virtual keyboard by a user who has a keyboard NFT based on an application.

Also, the processor 3220 measures the ability of the keyboard NFT in consideration of the attribute of the keyboard NFT that changes depending on the amount of usage of the virtual keyboard and the amount of usage a word of a word NFT mapped to the user.

Here, the attribute of the keyboard NFT includes efficiency, which is a positive attribute having a value increasing based on the amount of usage, and durability, which is a negative attribute having a value decreasing based on the amount of usage, the durability decreases with an increase in the amount of usage, and the rate of decrease in the durability may decrease with an increase in the amount of word usage.

Here, the maximum number of word NFTs capable of being mapped may be set depending on the grade of the keyboard NFT.

Here, the ability of the keyboard NFT may correspond to a value acquired by applying the percentage of the current remaining durability, which is calculated based on the default value of the durability, to the amount of usage multiplied by the efficiency.

Here, an amount of cryptocurrency corresponding to the ability may be mined at each preset unit time while the virtual keyboard is being used.

Here, the default value of the attribute of the keyboard NFT may be set differently depending on the grade of the keyboard NFT.

Here, the efficiency may be increased using stat points that are given when the level of the keyboard NFT is raised based on experience points that are provided to correspond to the amount of usage.

Here, the durability may be restored to the default value thereof when cryptocurrency is paid for restoring the durability.

Also, the processor 3220 stops cryptocurrency mining when the degree of fatigue of the keyboard NFT becomes the maximum value thereof or when the time allowed for the user to mine per day has elapsed.

Here, when cryptocurrency is paid for restoring the degree of fatigue or the time allowed to mine per day, the degree of fatigue or the time allowed to mine per day may be restored to the default value thereof.

Also, when cryptocurrency is paid for enhancing the keyboard NFT, the processor 3220 enhances the keyboard NFT in consideration of the number of times available for enhancement, which is given to correspond to the grade of the keyboard NFT, and a preset probability of success of enhancement.

Here, when enhancing the keyboard NFT succeeds, the default value of the attribute of the keyboard NFT may be increased.

Here, the higher the grade of the keyboard NFT, the greater the number of times available for enhancement and the maximum number of word NFTs capable of being mapped.

Also, the processor 3220 mines an amount of cryptocurrency corresponding to the ability of the keyboard NFT while the virtual keyboard is being used.

Also, the processor 3220 pays the mined cryptocurrency to the user as a reward.

Also, the processor 3220 gives a weight to the ability of the keyboard NFT in consideration of whether a brand theme is applied.

Also, the processor 3220 pays cryptocurrency to the user as a reward for lending the keyboard NFT.

Also, when cryptocurrency is paid for minting, the processor 3220 combines two different types of keyboard NFTs possessed by the user, and provides a new type of keyboard NFT created through the combination to the user when minting succeeds with a preset probability of success of minting.

The memory 3230 may support the function for providing a virtual keyboard service that pays a cryptocurrency reward in consideration of an association between a keyboard NFT and a word NFT according to an embodiment of the present disclosure, as described above. Here, the memory 3230 may operate as separate mass storage, and may include a control function for performing operations.

Meanwhile, the apparatus for providing a virtual keyboard service includes memory installed therein, whereby information may be stored therein. In an embodiment, the memory is a computer-readable medium. In an embodiment, the memory may be a volatile memory unit, and in another embodiment, the memory may be a nonvolatile memory unit. In an embodiment, the storage device is a computer-readable medium. In different embodiments, the storage device may include, for example, a hard-disk device, an optical disk device, or any other kind of mass storage device.

Through the above-described apparatus for providing a virtual keyboard service that pays a cryptocurrency reward in consideration of an association between a keyboard NFT and a word NFT, a keyboard NFT and a word NFT, which have attributes associated with each other, are provided, whereby a user may be provided with a cryptocurrency reward while using a virtual keyboard.

Also, Communication To Earn (C2E), that is, a service through which users are able to make money by communicating with each other, is provided, whereby a service capable of incentivizing family members, friends, and acquaintances to actively communicate with each other and providing benefits therethrough may be provided.

Also, a virtual keyboard service in which blockchain technology is introduced into virtual keyboards used in user terminals is provided, whereby distinctive customer benefits and experiences may be provided, compared to a conventional virtual keyboard service that offers points as a reward.

Also, beyond the simple use of virtual keyboards for terminals by many users, more various benefits may be provided depending on the amount of usage of the virtual keyboards.

Also, the structure of a virtual keyboard service paying a cryptocurrency reward is designed so as to enable the transition to or from a virtual keyboard service through which points can be saved, whereby a large number of customers may be effectively secured.

Figure 33:
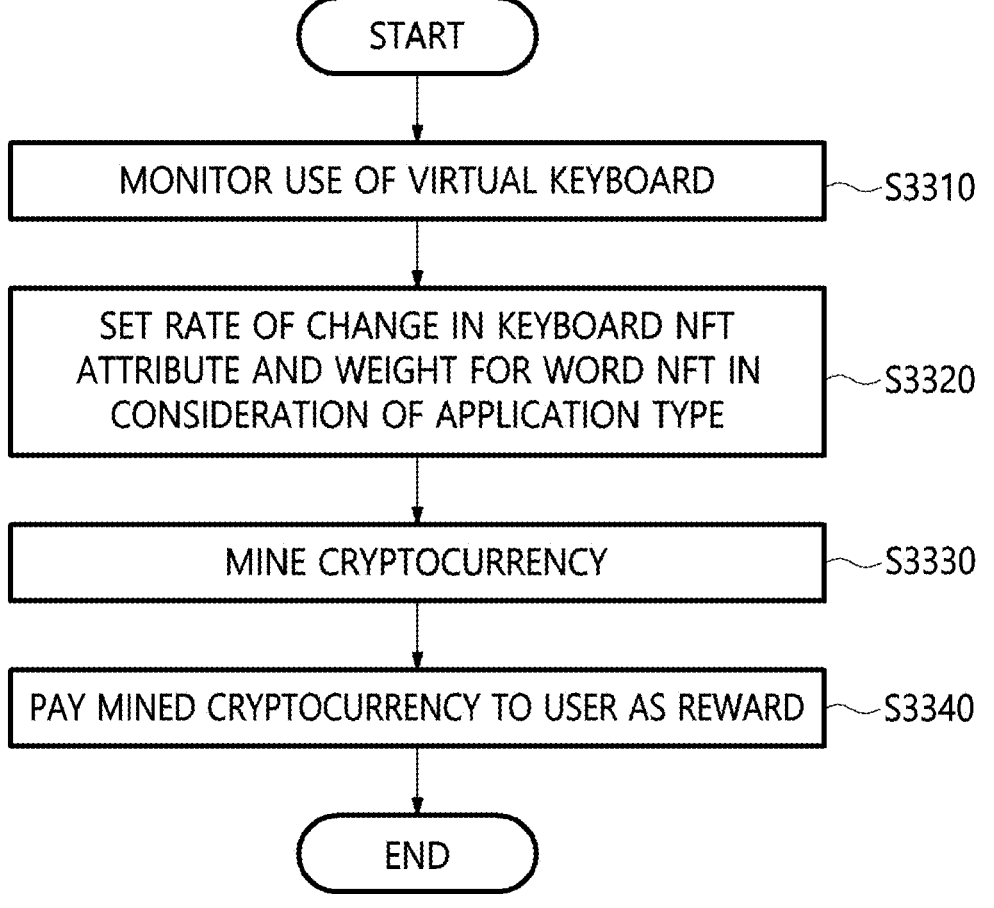
FIG. 33 is a flowchart illustrating a method for providing a virtual keyboard service that pays a cryptocurrency reward in consideration of a rate of change in an NFT attribute based on an application according to an embodiment of the present disclosure.

FIG. 33 is a flowchart illustrating a method for providing a virtual keyboard service that pays a cryptocurrency reward in consideration of a rate of change in an NFT attribute based on an application according to an embodiment of the present disclosure.

Referring to FIG. 33, in the method for providing a virtual keyboard service that pays a cryptocurrency reward in consideration of a rate of change in an NFT attribute based on an application according to an embodiment of the present disclosure, the use of a virtual keyboard by a user who has a keyboard NFT is monitored through an application at step S3310.

Here, the user may install the application provided from a server in a user terminal and execute the same. Also, the user may purchase the keyboard NFT from an NFT market, which is accessed through the application, and use the virtual keyboard.

Accordingly, when users who purchase a keyboard NFT from the NFT market activate and use a virtual keyboard in user terminals, the use of the virtual keyboard may be monitored.

Here, the keyboard NFT indicates a non-fungible token (NFT) that represents an item 1310 in the form of a keyboard, as illustrated in FIG. 13, and may be purchased from the NFT market that is accessible through the application installed in the user terminal.

For example, when the user purchases the keyboard NFT corresponding to the item 1310 in the form of a keyboard from the NFT market, a virtual keyboard to which a virtual keyboard skin 1320 that looks similar to the item 1310 in the form of a keyboard is applied may be activated and used in the user terminal. Accordingly, when chatting or communication occurs in the user terminal using the virtual keyboard to which the virtual keyboard skin 1320 is applied, this may be monitored, and a log about the use may be stored or managed.

Here, the virtual keyboard according to an embodiment of the present disclosure may be provided by being developed to correspond to SDK and APK types.

Also, in the method for providing a virtual keyboard service that pays a cryptocurrency reward in consideration of a rate of change in an NFT attribute based on an application according to an embodiment of the present disclosure, the rate of change in a keyboard NFT attribute corresponding to the keyboard NFT and a weight for a word NFT mapped to the user are set in consideration of the type of the application at step S3320.

Here, when the application is an affiliate application, the rate of change and the weight may be set so as to increase the amount of cryptocurrency mining at each unit time.

Here, the keyboard NFT attribute may include efficiency, which is a positive attribute having a value increasing based on the amount of usage, and durability, which is a negative attribute having a value decreasing based on the amount of usage.

Here, the ability of the keyboard NFT may correspond to a value acquired by applying the percentage of the current remaining durability, which is calculated based on the default value of the durability, to the amount of usage multiplied by the efficiency.

Here, an amount of cryptocurrency corresponding to the ability may be mined at each preset unit time while the virtual keyboard is being used.

Here, the durability decreases with an increase in the amount of usage, but may be restored to the default value thereof when cryptocurrency is paid for restoring the durability.

For example, the user may restore the durability to the maximum value thereof, which corresponds to the default value, by paying tokens or coins stored in the digital wallet of the user, or may restore the durability by watching an advertisement provided by the system or inviting friends to the service according to the present disclosure.

Here, when the application is an affiliate application, the rate of change may be set to correspond to at least one of an increase in the efficiency, or a decrease in the rate of decrease in the durability, or a combination thereof.

Hereinafter, keyboard NFT attributes and a cryptocurrency mining process based thereon will be described in detail with reference to FIGS. 34 to 36.

Figure 34:
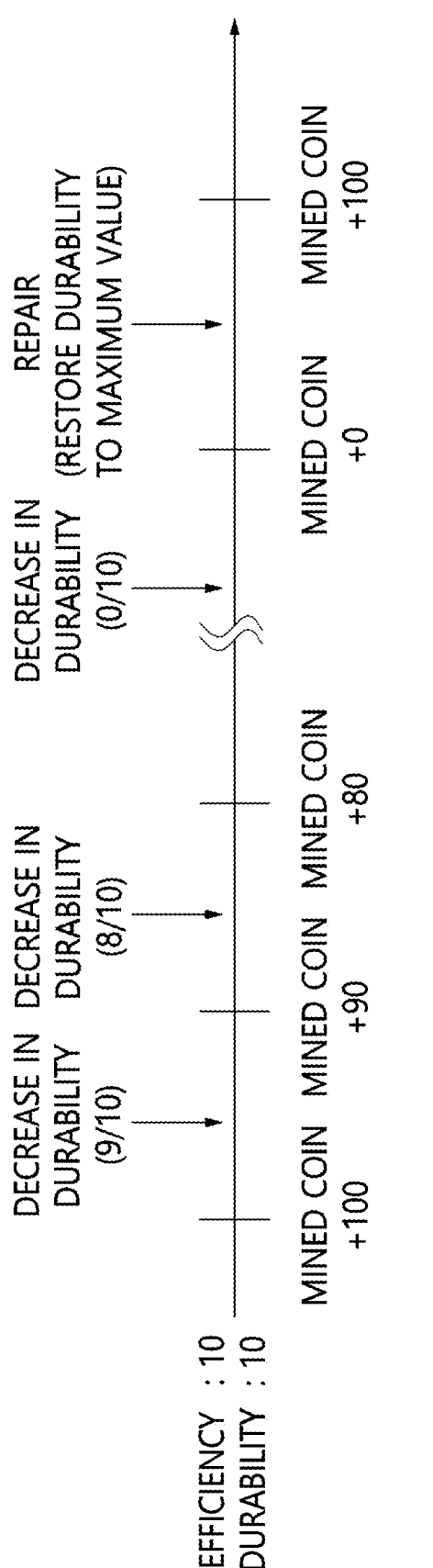
FIGS. 34 to 36 are views illustrating examples of an attribute of a keyboard NFT and the ability of the keyboard NFT based thereon according to the present disclosure.

First, FIG. 34 illustrates the amount of cryptocurrency mined per hour when a virtual keyboard, the efficiency and durability of which are respectively set to 10 and 10 as the default values thereof, is used.

For example, when it is assumed that the amount of usage of a virtual keyboard per unit time illustrated in FIG. 34 is 10, because the efficiency and the percentage of the remaining durability are 10 and 100%, respectively, during the first unit time, 100 coins, corresponding to 10*10*1, may be mined.

However, the durability decreases by 1 during the unit time after that, and the percentage of the remaining durability becomes 90%. Accordingly, it can be seen that only 90 coins, corresponding to 10*10*0.9, are mined during the corresponding unit time.

Because the durability decreases at a constant rate while the virtual keyboard is being used, as described above, when the durability reaches 0, it becomes impossible to mine cryptocurrency.

Accordingly, when the durability reaches 0, the durability is restored to the default value corresponding to the maximum value thereof by repairing the durability, after which cryptocurrency may be mined again.

Figure 35:
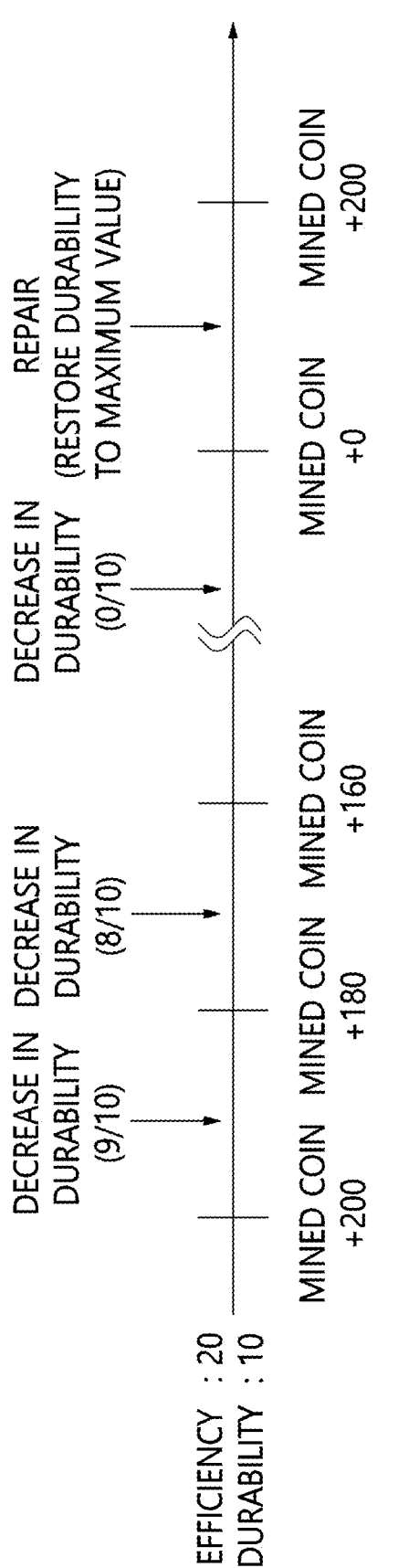

Also, FIG. 35 illustrates the amount of cryptocurrency mined per hour when a virtual keyboard, the efficiency and durability of which are respectively set to 20 and 10 as the default values thereof, is used.

For example, when it is assumed that the amount of usage of a virtual keyboard per unit time illustrated in FIG. 35 is 10, because the efficiency and the percentage of the remaining durability are 20 and 100%, respectively, during the first unit time, 200 coins, corresponding to 20*10*1, may be mined.

However, the durability decreases by 1 during the unit time after that, and the percentage of the remaining durability becomes 90%. Accordingly, only 180 coins, corresponding to 20*10*0.9, may be mined during the corresponding unit time.

Figure 36:
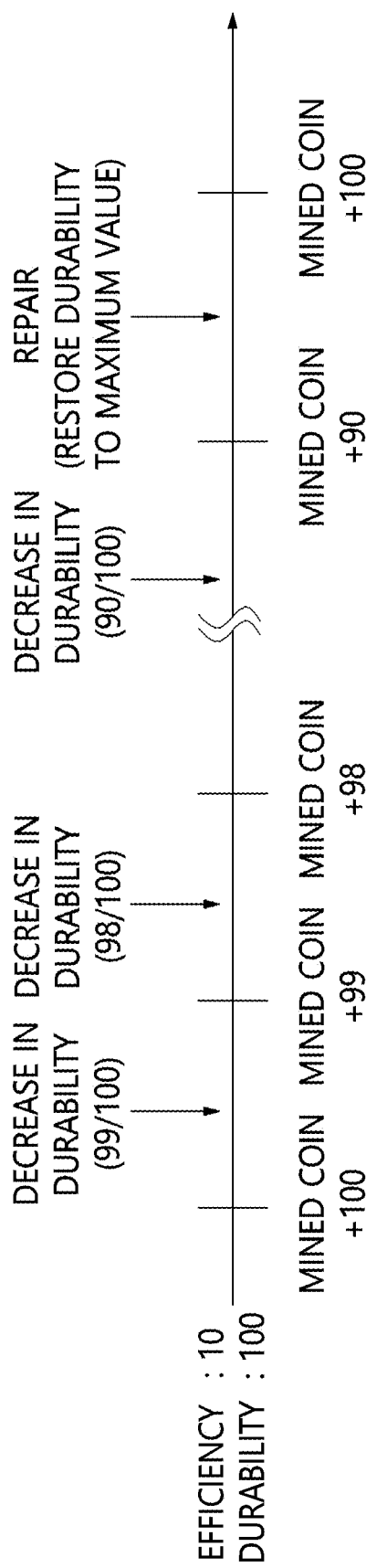

Also, FIG. 36 illustrates the amount of cryptocurrency mined per hour when a virtual keyboard, the efficiency and durability of which are respectively set to 10 and 100 as the default values thereof, is used.

For example, when it is assumed that the amount of usage of a virtual keyboard per unit time illustrated in FIG. 36 is 10, because the efficiency and the percentage of the remaining durability are 10 and 100%, respectively, during the first unit time, 100 coins, corresponding to 10*10*1, may be mined.

However, the durability decreases by 1 during the unit time after that, and the percentage of the remaining durability becomes 99%. Accordingly, only 99 coins, corresponding to 10*10*0.99, may be mined during the corresponding unit time.

Here, the rate of decrease in the durability may decrease with an increase in the amount of word usage.

Figure 37:
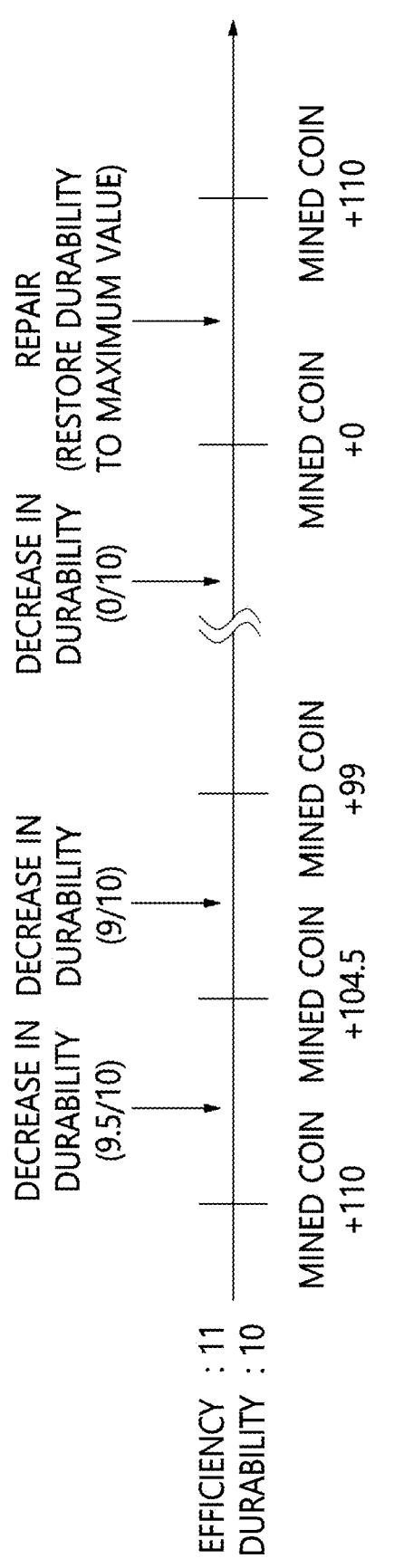
FIG. 37 is a view illustrating an example in which a rate of change is applied to an attribute of a keyboard NFT by using an affiliate application according to the present disclosure.
Figure 43:
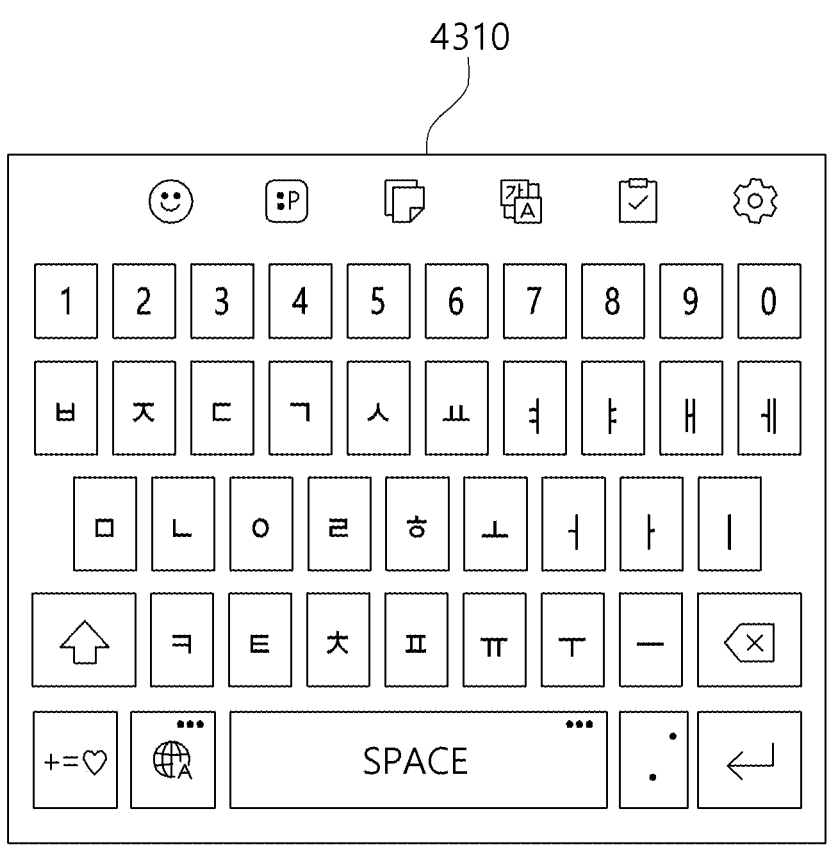
FIG. 43 is a view illustrating an example of a virtual keyboard according to the present disclosure.

For example, the virtual keyboard illustrated in FIG. 37 may be the case in which it used to have the same efficiency and durability as the virtual keyboard illustrated in FIG. 34, but an affiliate application causes the efficiency to be increased and causes the rate of decrease in the durability to be reduced.

Referring to FIG. 37, because the efficiency increased by using the affiliate application and the percentage of the remaining durability are 11 and 100%, respectively, during the first unit time, 110 coins, corresponding to 11*10*1, may be mined. However, the durability decreases by 0.5 during the unit time after that, whereby the percentage of the remaining durability becomes 95%. Accordingly, 104.5 coins, corresponding to 11*10*0.95, may be mined during the corresponding unit time.

Here, comparing the rate of decrease in the durability of the virtual keyboard illustrated in FIG. 34 with that of the virtual keyboard illustrated in FIG. 37, it can be seen that the durability decreases by 1 after the first unit time in the example of FIG. 34, but the durability of the virtual keyboard illustrated in FIG. 37 decreases by 0.5 after the first unit time. That is, in the case of the virtual keyboard illustrated in FIG. 37, the rate of decrease in the durability is reduced by using the affiliate application, unlike the virtual keyboard illustrated in FIG. 34. Accordingly, the durability of the virtual keyboard is more slowly reduced, whereby the virtual keyboard may be used longer without a repair.

Here, the drawing illustrated in FIG. 37 corresponds to an embodiment, and the relationship between an increase in the efficiency and the decrease in durability loss rate by an affiliate application may be set and changed by a service administrator.

Here, a word NFT may be a non-fungible token (NFT) that represents the ownership of each word for words that a user inputs through the virtual keyboard. Accordingly, a user having a specific word NFT may be provided with a reward depending on the amount of usage of the word corresponding thereto.

For example, statistics on input words are collected in the application providing the virtual keyboard service, an amount of cryptocurrency obtainable in proportion to the amount of usage of each word is assigned to the owner of the word NFT of the word, and part of the cryptocurrency obtained through the word NFT may be provided depending on the ability of the keyboard NFT possessed by the owner of the word NFT.

TABLE 2

| word | usage | mining amount | price at which transaction is made |
|---|---|---|---|
| keyboard is | 10 | 0.001 coins | 1 coin |
| to keyboard | 20 | 0.002 coins | 2 coins |

TABLE 2-continued

| word | usage | mining amount | price at which transaction is made |
|---|---|---|---|
| of keyboard | 50 | 0.005 coins | 5 coins |
| is keyboard | 100 | 0.01 coins | 10 coins |
| keyboard | 300 | 0.03 coins | 30 coins |

Here, as in the example in Table 2, the price at which a word NFT trades may be set in consideration of the amount of usage of each word. That is, a word NFT for a frequently used word may trade at a high price, but a word NFT for a word that is relatively less used may trade at a low price.

Accordingly, the value of the word NFT may vary depending on issues, such as popularity of a specific word, an increase in the usage of a specific word, and the like.

Here, when the application is an affiliate application, a weight may be increased such that the amount of cryptocurrency mining is increased depending on the amount of usage of a word.

TABLE 3

| word NFT | usage | usage ratio | mining allotment | weight | actually mined amount |
|---|---|---|---|---|---|
| word 1 | 100 times | 0.1 | 100 coins | 100% | 100 coins |
| word 2 | 200 times | 0.2 | 200 coins | 30% | 60 coins |
| word 3 | 700 times | 0.7 | 700 coins | 10% | 70 coins |
| total | 1000 times | 1 | 1000 coins | | 230 coins |

Referring to Table 3, the usage of a word, the usage ratio, a mining allotment, a weight, and an actually mined amount based on the amount of usage of the word are illustrated for each of word 1, word 2, and word 3 corresponding to word NFTs. In Table 3, in the case of the word NFT corresponding to word 1, the amount of cryptocurrency mining depending on the usage of the word is 100 coins, and when the weight of 100% is applied thereto, the actually mined amount may be 100 coins. In the case of the word NFT corresponding to word 2, the amount of cryptocurrency mining depending on the usage of the word is 200 coins, but when the weight of 30% is applied thereto, the actually mined amount may be 60 coins. Also, in the case of the word NFT corresponding to word 3, the amount of cryptocurrency mining depending on the usage of the word is 700 coins, but when the weight of 10% is applied thereto, the actually mined amount may be 70 coins.

If the user who has the word NFTs illustrated in Table 3 uses the virtual keyboard through an affiliate application, an increased weight may be applied, as shown in Table 4 below.

TABLE 4

| word NFT | usage | usage ratio | mining allotment | weight | actually mined amount |
|---|---|---|---|---|---|
| word 1 | 100 times | 0.1 | 100 coins | 110% | 110 coins |
| word 2 | 200 times | 0.2 | 200 coins | 40% | 80 coins |
| word 3 | 700 times | 0.7 | 700 coins | 20% | 140 coins |
| Total | 1000 times | 1 | 1000 coins | | 330 coins |

That is, referring to Table 4, the weights for word 1, word 2, and word 3 corresponding to the word NFTs may be increased to 110%, 40%, and 20%, respectively, by using an affiliate application. Accordingly, it can be seen that the amount of cryptocurrency mining based on the usage of the word of each of the word NFTs is increased.

Here, the amount of cryptocurrency mining increases in proportion to the usage of the word multiplied by the weight, and when multiple word NFTs are mapped to a single user, the amount of cryptocurrency mining may increase so as to correspond to a proportion preset depending on the number of word NFTs.

Here, according to the present disclosure, when a user having a keyboard NFT also has a word NFT, the amount of cryptocurrency mining may increase. That is, when user A having only a keyboard NFT and user B having both a keyboard NFT and a word NET use the virtual keyboard for the same amount of time, the amount of cryptocurrency mining by user B may be greater than that by user A.

Here, the maximum number of word NFTs capable of being mapped may be set depending on the grade of the keyboard NFT. That is, the number of word NFTs that can be possessed by the user may be set depending on the grade of the keyboard NFT possessed by the user.

For example, at most one word NFT may be mapped to the user having a keyboard NFT 3810 of a normal grade, at most two word NFTs may be mapped to the user having a keyboard NFT 3820 of a rare grade, and at most three word NFTs may be mapped to the user having a keyboard NFT 3830 of a legend grade, as illustrated in FIG. 38. Accordingly, as the higher the grade of the keyboard NFT, the user may have more word NFTs, and the amount of cryptocurrency mining may also increase in proportion thereto.

Here, the amount of cryptocurrency mining increasing with an increase in the number of word NFTs may gradually decrease.

For example, assuming that, when one word NFT is possessed, one coin is mined depending on the usage of the corresponding word, settings may be made such that, when two word NFTs are possessed, 1.8 coins can be mined depending on the usage of the words corresponding thereto and that, when three word NFTs are possessed, 2.4 coins can be mined depending on the usage of the words corresponding thereto.

Here, the default value of the attribute of the keyboard NFT may be set differently depending on the grade of the keyboard NFT.

For example, referring to FIG. 38, the grades of the keyboard NFT according to the present disclosure may be classified into 'normal', 'rare', and 'legend'. 'Normal' may be the lowest grade, 'rare' may be a grade higher than 'normal', and 'legend' may be a grade higher than 'rare'.

Here, if the default values of the NFT keyboard attributes of the keyboard NFT 3810 corresponding to the normal grade are set to efficiency of 5 and durability of 5, the default values of the NFT keyboard attributes of the keyboard NFT 3820 corresponding to the rare grade may be set to efficiency of 7 and durability of 7 so as to be higher than those of the normal grade, and the default values of the keyboard NFT attributes of the keyboard NFT 3830 corresponding to the legend grade may be set to efficiency of 10 and durability of 10 so as to be higher than those of the rare grade.

Here, the efficiency may be increased using stat points that are given when the level of the keyboard NFT is raised based on experience points that are provided to correspond to the amount of usage.

For example, referring to FIG. 39, when it is assumed that the level of the keyboard NFT 3910 corresponding to the rare grade is raised from level 1 to level 2 based on the experience points, 1 point may be given as stat points. The given stat points may be used to increase the keyboard NFT attribute. That is, the stat points of the keyboard NFT 3920 are used to increase the efficiency, as illustrated in FIG. 39, whereby the keyboard NFT attributes may be increased to efficiency of 8 and durability of 7, like the keyboard NFT 3930.

Here, the level of the keyboard NFT may correspond to the subordinate concept of the grade of the keyboard NFT, and a user may raise the level of the keyboard NFT by consuming tokens or coins corresponding to cryptocurrency. That is, the level of the keyboard NFT may be raised in response to a request from the user after the experience points provided to correspond to the amount of usage are accumulated to meet a preset level-up condition.

For example, assuming that the experience points meeting the preset level-up condition are 100, the user may use the virtual keyboard until the accumulated experience points become 100. Then, when the experience points become 100, the user may be notified of the fact that it is possible to raise the level of the corresponding virtual keyboard, and the user may request to raise the level by paying tokens corresponding to cryptocurrency stored in the digital wallet. The virtual keyboard, the level of which is requested to be raised by paying the tokens, may have the raised level after a certain time elapses.

Here, the time spent raising the level may be set differently depending on the value of the current level.

For example, assuming that it takes one hour to raise the level from level 1 to level 2, the time taken to raise the level from level 2 to level 3 may be set to two hours, and the time taken to raise the level from level 3 to level 4 may be set to three hours.

Also, although not illustrated in FIG. 33, in the method for providing a virtual keyboard service that pays a cryptocurrency reward in consideration of a rate of change in an NFT attribute based on an application according to an embodiment of the present disclosure, when cryptocurrency is paid for enhancing the keyboard NFT, the keyboard NFT is enhanced in consideration of the number of times available for enhancement, which is given to correspond to the grade of the keyboard NFT, and a preset probability of success of enhancement.

Here, when enhancing the keyboard NFT succeeds, the default value of the keyboard NFT attribute may be increased.

Here, enhancing the keyboard NFT may be the method for increasing the default value of the keyboard NFT attribute, separately from raising the level of the keyboard NFT. However, in the case of the level of the keyboard NFT, the value of the level is represented, so the level may be an indicator that shows how much a user enhances the corresponding keyboard NFT.

For example, FIG. 40 shows the process of attempting to enhance the keyboard NFT 4010 having level 10 and a rare grade when the keyboard NFT attributes thereof are set to efficiency of 16 and durability of 7 as the default values thereof. Here, because the number of times available for enhancement given to the keyboard NFT 4010 is three, it can be seen that the keyboard NFT 4010 may be enhanced three times. When a user attempts to enhance the keyboard NFT by paying cryptocurrency and succeeds in enhancement, the default values of the keyboard NFT attributes may be increased to efficiency of 19 and durability of 7, and simultaneously, the number of times available for enhancement may be reduced to 2, as illustrated in FIG. 40.

Here, the higher the grade of the keyboard NFT, the greater the number of times available for enhancement and the maximum number of word NFTs capable of being mapped.

That is, because the number of times available for enhancement varies depending on the grade of the keyboard NFT, as illustrated in FIG. 38, more opportunities to improve the default value of the keyboard NFT attribute may be given as the grade of the keyboard NFT is higher.

Here, the grade of the keyboard NFT is set when the keyboard NFT is purchased, and once the grade of the keyboard NFT is set, it may not be changed. Accordingly, the higher the grade of the keyboard NFT, the higher the value of the NFT.

For example, if a keyboard NFT of a normal grade can be purchased for 10 coins, a keyboard NFT of a rare grade may be purchased for 100 coins, and a keyboard NFT of a legend grade may be purchased for 1000 coins.

Here, the increase in the default value of the NFT attribute by enhancement of the keyboard NFT may be applied immediately when enhancement succeeds. Also, the increment in the default value of the NFT attribute by enhancement of the keyboard NFT may be greater than the increment in the default value of the NFT attribute by the stat points, which are given when the level of the keyboard NFT is raised.

Also, although not illustrated in FIG. 33, in the method for providing a virtual keyboard service that pays a cryptocurrency reward in consideration of a rate of change in an NFT attribute based on an application according to an embodiment of the present disclosure, when the degree of fatigue of the keyboard NFT becomes the maximum value thereof or when the time allowed for the user to mine per day has elapsed, cryptocurrency mining is stopped.

That is, the degree of fatigue may be a concept opposite to energy required to mine cryptocurrency through a keyboard NFT. Accordingly, when the degree of fatigue becomes the maximum value thereof, it is determined that there is no energy required to mine cryptocurrency, and the user may not mine cryptocurrency even though the user continues using the virtual keyboard.

Here, the degree of fatigue may be initialized at each preset initialization period.

For example, assuming that the preset initialization period is one day, even though cryptocurrency cannot be mined today because the degree of fatigue reaches the maximum value thereof, the degree of fatigue can be initialized tomorrow, whereby it becomes possible to mine cryptocurrency again.

Here, the time allowed to mine per day is a concept similar to the degree of fatigue, but may be an attribute having another concept.

For example, the degree of fatigue is a concept in which cryptocurrency mining is stopped when the value thereof becomes the maximum value thereof by gradually increasing from the default value that is set to 0, and the time allowed to mine per day may be a concept in which cryptocurrency mining is stopped when the total amount of time during which the user mines cryptocurrency becomes eight hours if the default value thereof is set to eight hours.

Here, when cryptocurrency is paid for restoring the degree of fatigue or the time allowed to mine per day, the degree of fatigue or the time allowed to mine per day may be restored to the default value thereof.

Also, the degree of fatigue or the time allowed to mine per day may be restored by watching an advertisement provided by the system or inviting friends to the service according to the present disclosure.

Also, in the method for providing a virtual keyboard service that pays a cryptocurrency reward in consideration of a rate of change in an NFT attribute based on an application according to an embodiment of the present disclosure, an amount of cryptocurrency corresponding to the ability of the keyboard NFT to which the rate of change is applied and the amount of word usage to which a weight is applied is mined while the virtual keyboard is being used at step S3330.

Here, the mined cryptocurrency may be a type of keyboard tokens created for the corresponding service. The keyboard tokens may be used for the repair, the restoration, the purchase, and the like of the keyboard NFT, or may be exchanged with external coins through a cryptocurrency exchange.

Also, in the method for providing a virtual keyboard service that pays a cryptocurrency reward in consideration of a rate of change in an NFT attribute based on an application according to an embodiment of the present disclosure, the mined cryptocurrency is paid to the user as a reward at step S3340.

Here, the mined cryptocurrency may correspond to unstable tokens or keyboard tokens autonomously issued by the company providing the service according to the present disclosure, and the issued tokens may be used after being changed to external coins.

For example, when a user requests to change keyboard tokens A mined through the use of the virtual keyboard to external coins B, the current price of keyboard tokens A and that of external coins B are compared with each other, and a number of external coins B equal to the value of keyboard tokens A, which are requested to be changed, may be paid.

Also, although not illustrated in FIG. 33, in the method for providing a virtual keyboard service that pays a cryptocurrency reward in consideration of a rate of change in an NFT attribute based on an application according to an embodiment of the present disclosure, a weight is given to the ability of the keyboard NFT in consideration of whether a brand theme is applied.

That is, when the brand theme is applied, a weight is given to the ability of the keyboard NFT, whereby the amount of cryptocurrency mining may increase.

Here, the brand theme corresponds to a virtual keyboard skin that is produced and provided through affiliation with a company, and may be in the form of a skin that exposes a brand name or a brand logo on the virtual keyboard.

For example, assuming that the virtual keyboard 1110 illustrated in FIG. 11 is in the state in which no skin is applied, it can be seen that the virtual keyboard 1210 to which the brand theme is applied exposes a brand logo 1211 and a brand name 1212 through the skin, as illustrated in FIG. 12. Here, the brand logo 1211 or the brand name 1212 may be information that is simply exposed or may function as a link to the homepage or application of the affiliate company that provides the brand theme.

That is, the company providing the brand theme may have the effect of advertising the brand, and the user applies the brand theme, thereby giving a weight to the ability of the keyboard NFT and mining more cryptocurrency.

Here, FIG. 12 shows only an embodiment for the brand logo 1211 or the brand name 1212 based on application of the brand theme, but application of the brand theme is not limited to this configuration.

For example, the brand theme may be alternatively applied by exposing a brand advertisement in the margin space of the virtual keyboard or exposing a character, design, or the like for representing a specific brand on the virtual keyboard.

Also, the brand theme may be distributed free by the affiliate company in order to advertise the brand, or may be issued in the form of an NFT skin and managed as a limited edition of an NFT having rarity.

Also, although not illustrated in FIG. 33, in the method for providing a virtual keyboard service that pays a cryptocurrency reward in consideration of a rate of change in an NFT attribute based on an application according to an embodiment of the present disclosure, cryptocurrency is paid to a user as a reward for lending the keyboard NFT.

In the present disclosure, NFTs may be purchased, sold, or lent through the NFT market accessible through an application. When the user lends his or her NFT to another user, the borrower 4120 may pay a reward for the NFT to the user by sharing part of the reward (tokens) mined through the use of the virtual keyboard with the owner 4110 who lent the NFT, as illustrated in FIG. 41.

Also, although not illustrated in FIG. 33, in the method for providing a virtual keyboard service that pays a cryptocurrency reward in consideration of a rate of change in an NFT attribute based on an application according to an embodiment of the present disclosure, when cryptocurrency is paid for minting, two different types of keyboard NFTs possessed by the user are combined, and a new type of keyboard NFT created through the combination is provided to the user when minting succeeds with a preset probability of success of minting.

Here, minting may correspond to a concept of creating a user's own NFT, that is, cryptocurrency. Accordingly, the new NFT created through minting may be directly used by the user, but may be sold to another user through the NFT market.

For example, in the case of minting using an NFT keyboard according to the present disclosure, a new keyboard NFT 1430 may be minted by combining two different keyboard NFTs 1410 and 1420 when the two different keyboards NFTs 1410 and 1420 are possessed by a user, as illustrated in FIG. 14. Here, because it is necessary to pay cryptocurrency in order to attempt minting, a certain amount of tokens in the digital wallet of the user may be burnt when minting is attempted. Also, minting may succeed with a preset probability of success, and a new keyboard NFT may be created only when minting succeeds.

In summary, the amount of cryptocurrency mining in each case may be as shown in FIG. 10.

That is, a user who uses a virtual keyboard to which a brand theme is applied may mine more cryptocurrency than a user who purchases a keyboard NFT and uses a virtual keyboard when the amount of keyboard usage is the same.

Also, in order to mine more cryptocurrency per hour of use, a user may lend his or her keyboard NFT to another user or may obtain the ownership of multiple NFTs by purchasing the NFTs or minting an NFT, whereby more cryptocurrency may be mined.

Here, similar to the keyboard NFT described above, concepts such as a purchase, lending, minting, a grade, and the like may be present for the word NFT.

For example, the ownership of a specific word may be obtained by purchasing a word NFT trading in an NFT market, and a user may acquire a higher level of word NFT with a certain probability by combining the word NFTs possessed by the user. That is, describing an example of minting based on Table 2, a user having a word NFT corresponding to 'keyboard is' and a word NFT corresponding to 'of keyboard' attempts minting using the two word NFTs, thereby acquiring a word NFT corresponding to 'keyboard' that trades at a higher price.

Here, a minting success probability applied to minting of a word NFT may differ from that applied to minting of a keyboard NFT.

Also, the word NFT may have a concept of 'grade' similar to the keyboard NFT, and the grade of the word NFT may be set depending on the amount of usage of the word corresponding to the word NFT.

For example, the word NFT corresponding to 'keyboard', which is used the most as illustrated in Table 2, may have a high grade, and the word NFT corresponding to 'keyboard is' may be set to have a relatively low grade.

Through the method for providing a virtual keyboard service that pays a cryptocurrency reward in consideration of a rate of change in an NFT attribute based on an application, when a virtual keyboard is executed through a specific application, the amount of cryptocurrency mining is increased depending on the amount of usage of the virtual keyboard, whereby users may be encouraged to use the specific application.

Also, Communication To Earn (C2E), that is, a service through which users are able to make money by communicating with each other, is provided, whereby a service capable of incentivizing family members, friends, and acquaintances to actively communicate with each other and providing benefits therethrough may be provided.

Also, a virtual keyboard service in which blockchain technology is introduced into virtual keyboards used in user terminals is provided, whereby distinctive customer benefits and experiences may be provided, compared to a conventional virtual keyboard service that offers points as a reward.

Also, beyond the simple use of virtual keyboards for terminals by many users, more various benefits may be provided depending on the amount of usage of the virtual keyboards.

Also, the structure of a virtual keyboard service paying a cryptocurrency reward is designed so as to enable the transition to or from a virtual keyboard service through which points can be saved, whereby a large number of customers may be effectively secured.

Figure 44:
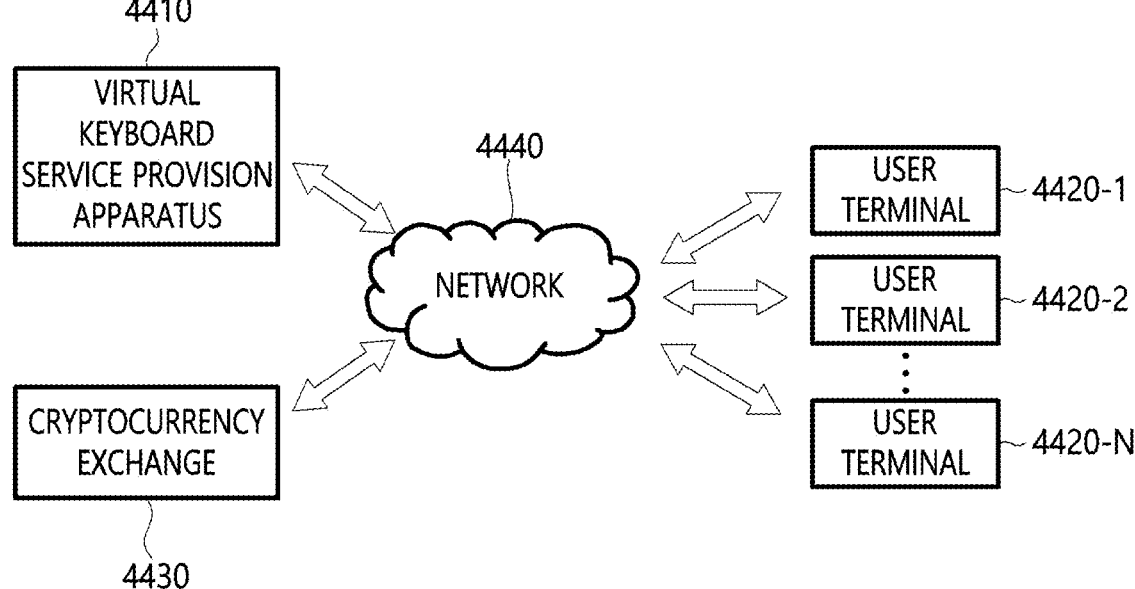
FIG. 44 is a view illustrating an example of a system for providing a virtual keyboard service that pays a cryptocurrency reward in consideration of a rate of change in an NFT attribute based on an application according to an embodiment of the present disclosure.

FIG. 44 is a view illustrating an example of a system for providing a virtual keyboard service that pays a cryptocurrency reward in consideration of a rate of change in an NFT attribute based on an application according to an embodiment of the present disclosure.

Referring to FIG. 44, the system for providing a virtual keyboard service that pays a cryptocurrency reward in consideration of a rate of change in an NFT attribute based on an application according to an embodiment of the present disclosure includes a virtual keyboard service provision apparatus 4410, user terminals 4420-1 to 4420-N, a cryptocurrency exchange 4430, and a network 4440.

The virtual keyboard service provision apparatus 4410 monitors the use of a virtual keyboard by a user who has a keyboard NFT based on an application.

Also, the virtual keyboard service provision apparatus 4410 sets the rate of change in a keyboard NFT attribute corresponding to the keyboard NFT and a weight for a word NFT mapped to the user in consideration of the type of the application.

Here, when the application is an affiliate application, the rate of change and the weight may be set so as to increase the amount of cryptocurrency mining at each unit time.

Here, the keyboard NFT attribute includes efficiency, which is a positive attribute having a value increasing based on the amount of usage, and durability, which is a negative attribute having a value decreasing based on the amount of usage, and the default value of the keyboard NFT attribute may be set differently depending on the grade of the keyboard NFT.

Here, when the application is an affiliate application, the rate of change may be set so as to correspond to an increase in the efficiency, or a decrease in the rate of decrease in the durability, or a combination thereof.

Here, when the application is an affiliate application, the weight may be increased so as to increase the amount of cryptocurrency mining depending on the amount of usage of a word.

Here, the amount of cryptocurrency mining increases in proportion to the amount of usage of a word multiplied by the weight, and when multiple word NFTs are mapped to a single user, the amount of cryptocurrency mining may increase so as to correspond to a proportion preset depending on the number of word NFTs.

Here, the ability of the keyboard NFT may correspond to a value acquired by applying the percentage of the current remaining durability, which is calculated based on the default value of the durability, to the amount of usage multiplied by the efficiency.

Here, the efficiency is increased using stat points that are given when the level of the keyboard NFT is raised based on experience points that are provided to correspond to the amount of usage, and the durability decreases with an increase in the amount of usage, but may be restored to the default value thereof when cryptocurrency is paid for restoring the durability.

Also, the virtual keyboard service provision apparatus 4410 mines an amount of cryptocurrency corresponding to the ability of the keyboard NFT, to which the rate of change is applied, and the amount of usage of a word, to which the weight is applied, while the virtual keyboard is being used.

Also, the virtual keyboard service provision apparatus 4410 pays the mined cryptocurrency to the user as a reward.

Also, the virtual keyboard service provision apparatus 4410 stops cryptocurrency mining when the degree of fatigue of the keyboard NFT is the maximum value thereof or when the time allowed for the user to mine per day has elapsed.

Here, when cryptocurrency is paid for restoring the degree of fatigue or the time allowed to mine per day, the degree of fatigue or the time allowed to mine per day may be restored to the default value thereof.

Each of the user terminals 4420-1 to 4420-N may access an NFT market via an application that a user is provided from the virtual keyboard service provision apparatus 4410, and may activate a virtual keyboard based on the keyboard NFT purchased from the NFT market.

The virtual keyboard based on the keyboard NFT is activated as described above, whereby cryptocurrency may be mined when the user is using the virtual keyboard while communicating with other people.

For example, the user terminals 4420-1 to 4420-N may be devices capable of running an application according to the present disclosure by being connected to a communication network, and may be any of various types of terminals including all types of information communication devices, multimedia terminals, Internal Protocol (IP) terminals, and the like, rather than being limited to mobile communication terminals. Also, the user terminal may be a mobile terminal compliant with any of various mobile communication specifications, such as a mobile phone, a Portable Multimedia Player (PMP), a Mobile Internet Device (MID), a smartphone, a tablet PC, a laptop, a net book, a Personal Digital Assistant (PDA), an information communication device, or the like.

Also, each of the user terminals 4420-1 to 4420-N may receive various kinds of information, such as numbers, letters, and the like, and may transfer signals input in connection with settings of various functions and control of the functions thereof to the control unit thereof via the input unit thereof. Also, the input unit of each of the user terminals 4420-1 to 4420-N may be formed by including at least one of a keypad, or a touch pad, or a combination thereof, which generates an input signal in response to a touch or manipulation by a user. Here, the input unit of each of the user terminals 4420-1 to 4420-N and the display unit thereof are configured in the form of a single touch panel (or a touch screen), thereby performing both an input function and a display function. Also, the input unit of each of the user terminals 4420-1 to 4420-N may use not only input devices, such as a keyboard, a keypad, a mouse, a joystick, and the like, but also all types of input means to be developed in the future.

Also, the display unit of each of the user terminals 4420-1 to 4420-N may display information about a series of operation states and operation results, which is generated when the user terminal performs a function. Also, the display unit of each of the user terminals 4420-1 to 4420-N may display the menu thereof and user data input by a user. Here, the display unit of each of the user terminals 4420-1 to 4420-N may be configured as a Liquid Crystal Display (LCD), a Thin Film Transistor LCD (TFT-LCD), a Light-Emitting Diode (LED), an Organic LED (OLED), an Active Matrix OLED (AMOLED), a retina display, a flexible display, a 3-dimensional display, or the like. Here, when the display unit of each of the user terminals 4420-1 to 4420-N is configured in the form of a touch screen, the display unit of the user terminal may perform some or all of the functions of the input unit thereof. Particularly, the display unit of each of the user terminals 4420-1 to 4420-N according to the present disclosure may display an interface provided for providing a cryptocurrency reward using a keyboard NFT and information about execution of an application on the screen.

Also, the storage unit of each of the user terminals 4420-1 to 4420-N may include a main storage device and an auxiliary storage device as devices for storing data, and may store applications required for performing the functions of the user terminal. The storage unit of each of the user terminals 4420-1 to 4420-N may include a program area and a data area. Here, when each of the user terminals 4420-1 to 4420-N activates each function in response to a request from a user, the user terminal provides the function by running corresponding applications under the control of the control unit. Particularly, the storage unit of each of the user terminals 4420-1 to 4420-N according to the present disclosure may store an Operating System (OS) for booting the user terminal, an application for providing a cryptocurrency reward, and the like. Also, the storage unit of each of the user terminals 4420-1 to 4420-N may store information about the user terminal. Here, the information about each of the user terminals 4420-1 to 4420-N may include terminal specification information.

Also, the communication unit of each of the user terminals 4420-1 to 4420-N may perform functions for transmitting and receiving data to and from the virtual keyboard service provision apparatus 4410 or the cryptocurrency exchange 4430 via the network 4440. Here, the communication unit of each of the user terminals 4420-1 to 4420-N may include an RF transmission means for up-conversion and amplification of the frequency of the signal to be transmitted and an RF reception means for low-noise amplification of a received signal and down-conversion of the frequency thereof. Such a communication unit of each of the user terminals 4420-1 to 4420-N may include a wireless communication module. The wireless communication module is a component for transmitting and receiving data based on a wireless communication method, and when the user terminals 4420-1 to 4420-N use wireless communication, they may transmit and receive data to and from the virtual keyboard service provision apparatus 4410 or the cryptocurrency exchange 4430 using any one of a wireless network communication module, a wireless LAN communication module, and a wireless PAN communication module. That is, the user terminals 4420-1 to 4420-N may access the network 4440 using the wireless communication module, and may transmit and receive data to and from the virtual keyboard service provision apparatus 4410 or the cryptocurrency exchange 4430 via the network 4440. Particularly, the network 4440 according to the present disclosure communicates with the virtual keyboard service provision apparatus 4410, the cryptocurrency exchange 4430, or the user terminals 4420-1 to 4420-N, thereby transmitting and receiving data required for providing a cryptocurrency reward.

Also, the control unit of each of the user terminals 4420-1 to 4420-N may be a processing device for running an Operating System (OS) and respective components. For example, the control unit may control the overall process of accessing the virtual keyboard service provision apparatus 4410 or the cryptocurrency exchange 4430. When access to the virtual keyboard service provision apparatus 4410 or the cryptocurrency exchange 4430 is made through an application, the control unit may control the overall process of running the application in response to a request from a user, and may perform control so as to transmit a request to use a service to the virtual keyboard service provision apparatus 4410 or the cryptocurrency exchange 4430 at the time of execution of the application. Here, the control unit may perform control such that information about the user terminal required for user authentication is transmitted along with the request.

The cryptocurrency exchange 4430 may be a server for the transition or exchange between cryptocurrency and flat currency.

For example, cryptocurrency that is mined whereby a user uses a virtual keyboard based on a keyboard NFT may be stored in the digital wallet of each of the user terminals 4420-1 to 4420-N. The stored cryptocurrency may be changed to a different kind of cryptocurrency or exchanged with flat currency through the cryptocurrency exchange 4430.

The network 4440 may provide a channel via which data is transferred between the virtual keyboard service provision apparatus 4410, the cryptocurrency exchange 4430, and the user terminals 4420-1 to 4420-N, and may be conceptually understood as including all of networks that are currently being used and networks that have yet to be developed. For example, the network may be any one of wired/wireless local area networks for providing communication between various kinds of data devices in a limited area, a mobile communication network for providing communication between mobile devices or between a mobile device and the outside thereof, a satellite communication network for providing communication between earth stations using a satellite, and wired/wireless communication networks, or may be a combination of two or more selected therefrom. Meanwhile, a transmission protocol standard for the network is not limited to existing transmission protocol standards, but may include all transmission protocol standards to be developed in the future.

Figure 45:
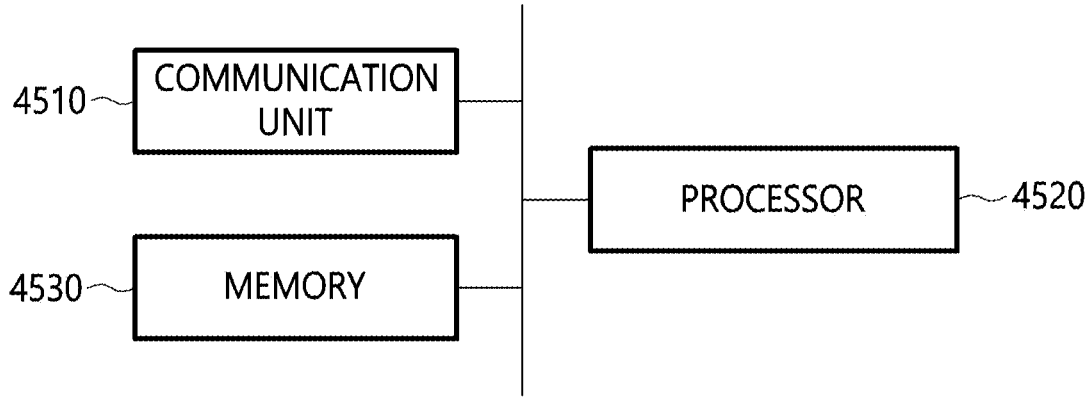
FIG. 45 is a block diagram illustrating an example of an apparatus for providing a virtual keyboard service that pays a cryptocurrency reward in consideration of a rate of change in an NFT attribute based on an application according to an embodiment of the present disclosure.

FIG. 45 is a block diagram illustrating an example of an apparatus for providing a virtual keyboard service that pays a cryptocurrency reward in consideration of a rate of change in an NFT attribute based on an application according to an embodiment of the present disclosure.

Referring to FIG. 45, the apparatus for providing a virtual keyboard service that pays a cryptocurrency reward in consideration of a rate of change in an NFT attribute based on an application according to an embodiment of the present disclosure includes a communication unit 4510, a processor 4520, and memory 4530.

The communication unit 4510 serves to transmit and receive information required for providing a virtual keyboard service that pays a cryptocurrency reward in consideration of a rate of change in an NFT attribute based on an application through a communication network. Particularly, the communication unit 4510 according to an embodiment of the present disclosure may receive data on the cryptocurrency to be paid to a user from the virtual keyboard service provision apparatus or the cryptocurrency exchange in real time.

The processor 4520 monitors the use of a virtual keyboard by a user who has a keyboard NFT based on an application.

Also, the processor 4520 sets the rate of change in a keyboard NFT attribute corresponding to the keyboard NFT and a weight for a word NFT mapped to the user in consideration of the type of the application.

Here, when the application is an affiliate application, the rate of change and the weight may be set such that the amount of cryptocurrency mining increases at each unit time.

Here, the keyboard NFT attribute includes efficiency, which is a positive attribute having a value increasing based on the amount of usage, and durability, which is a negative attribute having a value decreasing based on the amount of usage, and the default value of the keyboard NFT attribute may be set differently depending on the grade of the keyboard NFT.

Here, when the application is an affiliate application, the rate of change may be set so as to correspond to at least one of an increase in the efficiency, or a decrease in the rate of decrease in the durability, or a combination thereof.

Here, when the application is an affiliate application, the weight may increase so as to increase the amount of cryptocurrency mining depending on the amount of usage of a word.

Here, the amount of cryptocurrency mining increases in proportion to the amount of usage of a word multiplied by the weight, and when multiple word NFTs are mapped to a single user, the amount of cryptocurrency mining may increase so as to correspond to a proportion preset depending on the number of word NFTs.

Here, the ability of the keyboard NFT may correspond to a value acquired by applying the percentage of the current remaining durability, which is calculated based on the default value of the durability, to the amount of usage multiplied by the efficiency.

Here, the efficiency may be increased using stat points that are given when the level of the keyboard NFT is raised based on experience points that are provided to correspond to the amount of usage, and the durability decreases with an increase in the amount of usage, but may be restored to the default value thereof when cryptocurrency is paid for restoring the durability.

Also, the processor 4520 mines an amount of cryptocurrency corresponding to the ability of the keyboard NFT, to which the rate of change is applied, and the amount of word usage, to which the weight is applied, while the virtual keyboard is being used.

Also, the processor 4520 pays the mined cryptocurrency to the user as a reward.

Also, the processor 4520 stops cryptocurrency mining when the degree of fatigue of the keyboard NFT becomes the maximum value thereof or when the time allowed for the user to mine per day has elapsed.

Here, when cryptocurrency is paid for restoring the degree of fatigue or the time allowed to mine per day, the degree of fatigue or the time allowed to mine per day may be restored to the default value thereof.

The memory 4530 may support the function for providing a virtual keyboard service that pays a cryptocurrency reward in consideration of a rate of change in an NFT attribute based on an application according to an embodiment of the present disclosure, as described above. Here, the memory 4530 may operate as separate mass storage, and may include a control function for performing operations.

Meanwhile, the apparatus for providing a virtual keyboard service includes memory installed therein, whereby information may be stored therein. In an embodiment, the memory is a computer-readable medium. In an embodiment, the memory may be a volatile memory unit, and in another embodiment, the memory may be a nonvolatile memory unit. In an embodiment, the storage device is a computer-readable medium. In different embodiments, the storage device may include, for example, a hard-disk device, an optical disk device, or any other kind of mass storage device.

Through the above-described apparatus for providing a virtual keyboard service that pays a cryptocurrency reward in consideration of a rate of change in an NFT attribute based on an application, when a virtual keyboard is executed through a specific application, the amount of cryptocurrency mining is increased depending on the amount of usage, whereby users may be encouraged to use the specific application.

Also, Communication To Earn (C2E), that is, a service through which users are able to make money by communicating with each other, is provided, whereby a service capable of incentivizing family members, friends, and acquaintances to actively communicate with each other and providing benefits therethrough may be provided.

Also, a virtual keyboard service in which blockchain technology is introduced into virtual keyboards used in user terminals is provided, whereby distinctive customer benefits and experiences may be provided, compared to a conventional virtual keyboard service that offers points as a reward.

Also, beyond the simple use of virtual keyboards for terminals by many users, more various benefits may be provided depending on the amount of usage of the virtual keyboards.

Also, the structure of a virtual keyboard service paying a cryptocurrency reward is designed so as to enable the transition to or from a virtual keyboard service through which points can be saved, whereby a large number of customers may be effectively secured.

According to the present disclosure, a keyboard NFT and a word NFT, which have attributes associated with each other, are provided, whereby a user may be provided with a cryptocurrency reward while using a virtual keyboard.

Also, the present disclosure increases, when a virtual keyboard is executed through a specific application, the amount of cryptocurrency mining depending on the amount of usage of the virtual keyboard, thereby encouraging users to use the specific application.

Also, the present disclosure provides Communication To Earn (C2E), that is, a service through which users are able to make money by communicating with each other, thereby providing a service capable of incentivizing family members, friends, and acquaintances to actively communicate with each other and providing benefits therethrough.

Also, the present disclosure provides a virtual keyboard service in which blockchain technology is introduced into virtual keyboards used in user terminals, thereby providing distinctive customer benefits and experiences compared to a conventional virtual keyboard service that offers points as a reward.

Also, the present disclosure enables a large number of users not only to use virtual keyboards for terminals but also to be provided with more various benefits depending on the amount of usage thereof.

Also, the present disclosure designs the structure of a virtual keyboard service paying a cryptocurrency reward so as to enable the transition to or from a virtual keyboard service through which points can be saved, thereby effectively securing a large number of customers.

The functional operations and implementations of the subject matter described herein may be implemented as digital electronic circuitry, or may be implemented in computer software, firmware, or hardware, including the structures disclosed herein and structural equivalents thereof, or a combination of one or more thereof. Implementations of the subject matter described herein may be implemented in one or more computer program products, in other words, one or more modules of computer program instructions encoded on a tangible program storage medium, in order to control the operation of a processing system or to be executed by the processing system.

The computer-readable medium may be a machine-readable storage device, a machine-readable storage substrate, a memory device, a composition of material that affects a machine-readable radio-wave-type signal, or a combination of one or more thereof.

In this specification, the terms 'system' and 'device' encompass all kinds of apparatuses, devices, and machines for processing data, which include, for example, a programmable processor and a computer, or multiple processors and a computer. In addition to hardware, the processing system may also include, for example, code that configures processor firmware and code that configures an execution environment for computer programs in response to a request for a protocol stack, a database management system, an operating system, or a combination of one or more thereof.

A computer program (also known as a program, software, a software application, a script, or code) may be written in any form of programming language including a compiled or interpreted language, or an a priori or procedural language, and may be deployed in any form including standalone programs or modules, components, subroutines, or other units suitable for being used in a computer environment. The computer program does not necessarily correspond to a file in a file system. The program may be stored in a single file provided to the requested program, in multiple interactive files (for example, files storing one or more modules, subprograms, or portions of code), or in a part of a file containing other programs or data (for example, one or more scripts stored in a markup language document). The computer program may be located at a single site, or may be distributed across multiple sites such that it is deployed to run on multiple computers interconnected by a communication network or on a single computer.

Meanwhile, the computer-readable medium suitable for storing computer program instructions and data may include, for example, semiconductor memory devices, such as EPROM, EEPROM and flash memory devices, all types of nonvolatile memory, including magnetic disks, such as internal hard disks or removable disks, magnetic optical disks, CD-ROM and DVD-ROM disks, media, and memory devices. A processor and memory may be supplemented by special-purpose logic circuits, or may be integrated therewith.

Implementations of the subject matter described herein may be realized on an arithmetic system including, for example, a back-end component such as a data server, a middleware component such as an application server, a front-end component such as a client computer having a web browser or a graphical user interface through which a user can interact with the implementations of the subject matter described herein, or all combinations of one or more of the back-end component, the middleware component, and the front-end component. The components of the system may be interconnected using any form or medium of digital data communication such as a communication network.

While this specification includes the details of multiple specific implementations, they should not be construed as limiting the scope of the disclosure or the claimable scope, but should be understood as descriptions of features that may be specific to particular embodiments of the disclosure. Similarly, the specific features described herein in the context of individual embodiments may be implemented by being combined in a single embodiment. Alternatively, various features described in the context of a single embodiment may also be implemented in multiple embodiments individually or in any suitable sub-combination. Further, although such features may be described as operating in a particular combination and initially claimed as such, one or more features from the claimed combination may be excluded from the combination in some cases, or the claimed combination may be altered to a sub-combination or variation thereof.

Also, while this specification illustrates operations in a particular order in the drawings, it should not be understood that such operations must be performed in the particular order or the sequential order shown in the drawings in order to obtain the desired result, or that all of the illustrated operations must be performed. In certain cases, multitasking and parallel processing may be advantageous. Also, separation of the various system components of the above-described embodiment should not be understood as requiring such separation in all embodiments, and it should be understood that the program components and systems described above may generally be integrated into a single software product or packaged into multiple software products.

As described above, this specification is not intended to limit the present disclosure to the specific terms disclosed herein. Therefore, although the present disclosure has been described in detail with reference to the above examples, those skilled in the art may conceive alterations, modifications, and variations on these examples without departing from the scope of the present disclosure. The scope of the present disclosure is defined by the appended claims rather than the description, and it should be construed that all alterations and modifications derived from the meaning and scope of the appended claims and their equivalents are included within the scope of the present disclosure.

According to the present disclosure, the use of a virtual keyboard by a user having a keyboard NFT may be monitored based on an application, the ability of the keyboard NFT may be measured in consideration of an attribute of the keyboard NFT that changes depending on the amount of usage of the virtual keyboard and the amount of usage a word of a word NFT mapped to the user, an amount of cryptocurrency corresponding to the ability of the keyboard NFT may be mined while the virtual keyboard is being used, and the mined cryptocurrency may be paid to the user as a reward.

Also, according to the present disclosure, the use of a virtual keyboard by a user having a keyboard NFT may be monitored through an application, the rate of change in a keyboard NFT attribute corresponding to the keyboard NFT and a weight for a word NFT mapped to the user may be set in consideration of the type of the application, an amount of cryptocurrency corresponding to the ability of the keyboard NFT, to which the rate of change is applied, and the amount of word usage, to which the weight is applied, may be mined while the virtual keyboard is being used, and the mined cryptocurrency may be paid to the user as a reward.

Furthermore, a keyboard service for terminals used by many users provides more various benefits beyond the simple use of the keyboard, so family members, friends, and acquaintances may be incentivized to frequently communicate with each other, whereby the use of the service may be effectively expanded.

What is claimed is:

1. A method for providing a virtual keyboard service, comprising:

monitoring, by a virtual keyboard service provision apparatus, use of a virtual keyboard executed on a user terminal, the virtual keyboard corresponding to a keyboard non-fungible token (NFT) through an application by a user of the user terminal;

setting, by the virtual keyboard service provision apparatus, a first rate of change in an efficiency attribute and a second rate of change in a durability attribute, corresponding to the keyboard NFT and a weight for a word NFT mapped to the user in consideration of a type of the application, the efficiency attribute increasing with a usage of the virtual keyboard and the durability attribute decreasing with the usage of the virtual keyboard;

receiving, by the virtual keyboard service provision apparatus, usage information including keyboard input log and word-usage statistics from the user terminal;

mining, by the virtual keyboard service provision apparatus, an amount of cryptocurrency that is determined at least by (i) an ability of the keyboard NFT defined as a function of the efficiency attribute and the durability attribute, (ii) a number of times a word corresponding to the word NFT is used, and (iii) the weight of the word NFT;

providing, by the virtual keyboard service provision apparatus, the keyboard NFT on one or a plurality of different blockchain networks, each blockchain network corresponding to a different type of cryptocurrency, and issuing keyboard tokens on the corresponding blockchain network;

enabling, by the virtual keyboard service provision apparatus in cooperation with a cryptocurrency exchange, cross-chain interoperability by linking keyboard tokens issued on different blockchain networks through a bridge and permitting conversion of the mined cryptocurrency into another type of cryptocurrency based on a request from the user terminal; and paying the mined or converted cryptocurrency to a digital wallet associated with the user terminal as a reward.

2. The method of claim 1, wherein, when the application is affiliated, the first rate of change and the weight are set so as to increase the amount of cryptocurrency mined at each unit time.

3. The method of claim 2, wherein:

each of keyboard NFTs including the keyboard NFT is assigned with a grade attribute that sets an initial value of the efficiency attribute and an initial value of the durability attribute.

4. The method of claim 2, wherein if the application is affiliated, the weight is increased to increase the amount of mined cryptocurrency.

5. The method of claim 4, wherein:

the amount of mined cryptocurrency is increased in proportion to the number of times the word is used multiplied by the weight, and the amount of mined cryptocurrency mining increases with increase in a number of word NFTs mapped to the user.

6. The method of claim 5, wherein an incremental increase in the amount of mined cryptocurrency decreases as the number of word NFTs mapped to the user increases.

\* \* \* \* \*